US00RE41059E

(19) United States
(12) Reissued Patent
Gano et al.

(10) Patent Number: US RE41,059 E
(45) Date of Reissued Patent: Dec. 29, 2009

(54) EXPANDABLE WELLBORE JUNCTION

(75) Inventors: John C. Gano, Carrollton, TX (US); Tommie A. Freeman, Lewisville, TX (US); John S. Bowling, Qurm (OM); James R. Longbottom, Magnolia, TX (US)

(73) Assignee: Halliburton Energy Services, Inc., Houston, TX (US)

(21) Appl. No.: 10/367,619

(22) Filed: Feb. 14, 2003

(Under 37 CFR 1.47)

Related U.S. Patent Documents

Reissue of:
(64) Patent No.: 6,189,616
Issued: Feb. 20, 2001
Appl. No.: 09/522,913
Filed: Mar. 10, 2000

U.S. Applications:
(62) Division of application No. 09/086,716, filed on May 28, 1998, now Pat. No. 6,135,208.

(51) Int. Cl.
*E21B 7/08* (2006.01)
*E21B 43/14* (2006.01)

(52) U.S. Cl. ..... 166/298; 166/55.1; 166/117.6; 166/313; 166/376; 175/81

(58) Field of Classification Search ..... 166/50, 166/55.1, 117.5, 117.6, 298, 313, 376; 175/79, 175/80, 81, 82
See application file for complete search history.

(56) References Cited

U.S. PATENT DOCUMENTS 2,331,293 A * 10/1943 Ballard ..... 166/117.5
2,397,070 A 3/1946 Zublin
3,757,877 A 9/1973 Leathers
4,413,682 A 11/1983 Callihan et al.
4,444,276 A 4/1984 Peterson, Jr.
5,058,676 A 10/1991 Fitzpatrick et al.

(Continued)

FOREIGN PATENT DOCUMENTS

| | | | |
|---|---|---|---|
| EP | 0136935 | * | 4/1985 |
| EP | 0 136 935 B1 | | 3/1987 |
| EP | 0795679 A2 | * | 2/1997 |
| EP | 0786578 | | 7/1997 |
| EP | 0859122 | | 8/1998 |
| EP | 0 795 679 B1 | | 5/2002 |
| WO | WO9403699 | | 2/1994 |
| WO | 96/23953 A1 | | 8/1996 |
| WO | 97/06345 A1 | | 2/1997 |
| WO | 99/13195 A1 | | 3/1999 |

OTHER PUBLICATIONS

Drilling Engineering Association "Rapid Junction" Project Proposal Form, Undated 1998 DEA Rapid Junction Proposal, dated Jan. 15, 1998.*
Canadian Office Action for application No. 2,272,680 dated Mar. 31, 2003.
Canadian Office Action for application No. 2,272,680 dated Dec. 4, 2003.
Partial European Search Report for application No. EP 04075738.
Search report for European application No. 07075994 dated Mar. 14, 2008.

*Primary Examiner*—George Suchfield
(74) *Attorney, Agent, or Firm*—Marlin R. Smith

(57) ABSTRACT

Multiple wellbores are interconnected utilizing a deflection device having a guide layer of lower hardness than the body of the deflection device, and a cutting tool having a guide portion and being operative to cut through the deflection device guide layer and a tubular structure lining a wellbore.

76 Claims, 16 Drawing Sheets

U.S. PATENT DOCUMENTS 5,255,741 A 10/1993 Alexander
5,318,122 A 6/1994 Murray et al.
5,330,007 A 7/1994 Collins et al.
5,348,095 A 9/1994 Worrall et al.
5,353,876 A 10/1994 Curington et al.
5,388,648 A 2/1995 Jordan, Jr.
5,425,559 A 6/1995 Nobileau
5,462,120 A 10/1995 Gondouin
5,520,252 A * 5/1996 McNair ..... 166/313
5,655,602 A 8/1997 Collins
5,667,011 A 9/1997 Gill et al.
5,695,008 A 12/1997 Bertet et al.
5,718,288 A 2/1998 Bertet et al.
5,771,972 A * 6/1998 Dewey et al. ..... 166/298
5,794,702 A 8/1998 Nobileau
5,813,465 A * 9/1998 Terrell et al. ..... 166/298
5,937,955 A * 8/1999 Nims et al. ..... 175/61
5,979,560 A 11/1999 Nobileau
6,024,168 A * 2/2000 Kuck et al. ..... 166/297
6,059,037 A * 5/2000 Longbottom et al. ..... 166/298
6,070,671 A 6/2000 Cumming et al.
6,078,031 A 6/2000 Bliault et al.
6,135,208 A 10/2000 Gano et al.
6,253,852 B1 7/2001 Nobileau
6,273,634 B1 8/2001 Lohbeck
6,318,457 B1 11/2001 Den Boer et al.
6,328,113 B1 12/2001 Cook
6,336,507 B1 1/2002 Collins
6,371,203 B2 4/2002 Frank et al.
6,371,211 B1 4/2002 Heijnen et al.
6,390,201 B1 5/2002 Coon et al.
6,390,202 B1 5/2002 Heijnen
6,419,025 B1 7/2002 Lohbeck et al.
6,431,282 B1 8/2002 Bosma et al.
6,454,493 B1 9/2002 Lohbeck
6,464,001 B1 10/2002 Braithwaite et al.

* cited by examiner

EXPANDABLE WELLBORE JUNCTION

Matter enclosed in heavy brackets [ ] appears in the original patent but forms no part of this reissue specification; matter printed in italics indicates the additions made by reissue.

This is a division of application Ser. No. 09/086,716, filed May 28, 1998, such prior application being incorporated by reference herein in its entirety.

BACKGROUND OF THE INVENTION

The present invention relates generally to operations performed in conjunction with subterranean wells and, in an embodiment described herein, more particularly provides methods and apparatus for interconnecting multiple wellbores.

It is well known in the art to drill multiple intersecting wellbores, for example, by drilling a main or parent wellbore extending to the earth's surface and then drilling one or more branch or lateral wellbores extending outwardly from the parent wellbore. However, interconnecting these wellbores at intersections thereof still present challenges.

It is important to prevent migration of fluids between earthen formations intersected by the wellbores, and also to isolate fluid produced from, or injected into, each wellbore from communications with those formations (except for the formations into, or from, which the fluid is injected or produced). Hereinafter, completion operations for production of fluid are discussed, it being understood that fluid may also, or alternatively, be injected into one or more of the wellbores.

An expandable wellbore junction permits a unitized structure to be positioned at a wellbore intersection. The expandable junction is then expanded to provide access to each of the wellbores therethrough. In this manner, the unitized wellbore junction may be conveyed through the dimensional confines of the parent wellbore, appropriately positioned at the wellbore intersection, and then expanded to provide a tubular portion thereof directed toward each wellbore.

Unfortunately, methods and apparatus have vet to be developed which address problems associated with utilizing expandable wellbore connectors. For example, it would be desirable for minimal dimensional restrictions to be presented where a linear or casing string extending into each of the wellbores is connected to the wellbore connector, in order to provide enhanced fluid flow and access therethrough. As another example, in some cases it would be desirable to be able to expand the wellbore connector in the parent wellbore prior to drilling the lateral wellbore. Additionally, it would be desirable to provide methods and apparatus for conveniently and advantageously attaching tubular members to the wellbore connector. It is accordingly an object of the present invention to provide such methods and apparatus.

SUMMARY OF THE INVENTION

In carrying out the principles of the present invention, in accordance with an embodiment thereof, methods and apparatus are provided which facilitate interconnection of multiple wellbores in a subterranean well.

In one aspect of the present invention, a method is provided in which a cavity is formed in a parent wellbore prior to drilling a lateral wellbore. The cavity is formed below casing lining the parent wellbore. An expandable wellbore connector is positioned in the cavity and expanded therein. The wellbore connector may be cemented in the cavity. The parent wellbore may then be executed, and the lateral wellbore may be drilled, by passing one or more cutting tools through the wellbore connector. Methods and apparatus for sealingly engaging the wellbore connector with tubular methods extending into the wellbores are also provided. In an alternate method, the cavity may be formed radially outwardly through the casing.

In another aspect of the present invention, a tubular member is sealingly attached to a wellbore connector by outwardly deforming the tubular member within the wellbore connector. The tubular member has a radially reduced portion with a sealing material carried externally on the radially reduced portion. When the tubular member is radially outwardly deformed, the sealing material is radially compressed between the tubular member and the wellbore connector. A grip member or slip may also be carried on the radially reduced portion of the tubular member. The grip member may be circumferentially continuous and may be disposed at least partially within the sealing material.

In yet another aspect of the present invention, methods and apparatus for sealingly attaching two tubular members are provided. One of the tubular members has a radially reduced portion and a sealing material carried externally on the radially reduced portion. The tubular member with the radially reduced portion is inserted into the other tubular member and the radially reduced portion is radially outwardly extended. This may be accomplished by any method, including swaging, applying fluid pressure within the radially reduced portion, axially compressing a member within the radially reduced portion, etc. Outward expansion of the radially reduced portion may also cause outward expansion of the outer tubular member, and may cause plastic deformation of the outer tubular member.

In still another aspect of the present invention, a wellbore connector in a parent wellbore is interconnected with a tubular structure positioned in a parent or lateral wellbore. A tubular member is inserted into one or both of the wellbore connector and the tubular structure. A radially reduced portion of the tubular member is then radially outwardly extended to sealingly engage one or both of the wellbore connector and the tubular structure. A minimum internal dimension of the tubular member may thereby be increased.

In another aspect of the present invention, a packer is formed by providing one or more radially reduced portions on a tubular body. A sealing material is disposed externally on each of the radially reduced portions. A grip member may also be carried on the radially reduced portion and may be molded at least partially into the sealing material.

In yet another aspect of the present invention, a method of forming an opening through a sidewall of a tubular structure lining a wellbore is provided. A deflection device having a substantially axially extending guide layer outwardly overlying a body of the deflection device is positioned in the wellbore. A cutting tool is then displaced axially relative to the deflection device. A guide portion of the cutting device engages the guide layer, guiding the cutting tool to form the opening while cutting through the guide layer.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Representatively illustrated in FIGS. 1A–1D is a method 10 of interconnecting wellbores which embodies principles of the present invention. In the following description of the method 10 and other methods and apparatus described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., without departing from the principles of the present invention.

Figure 1A:
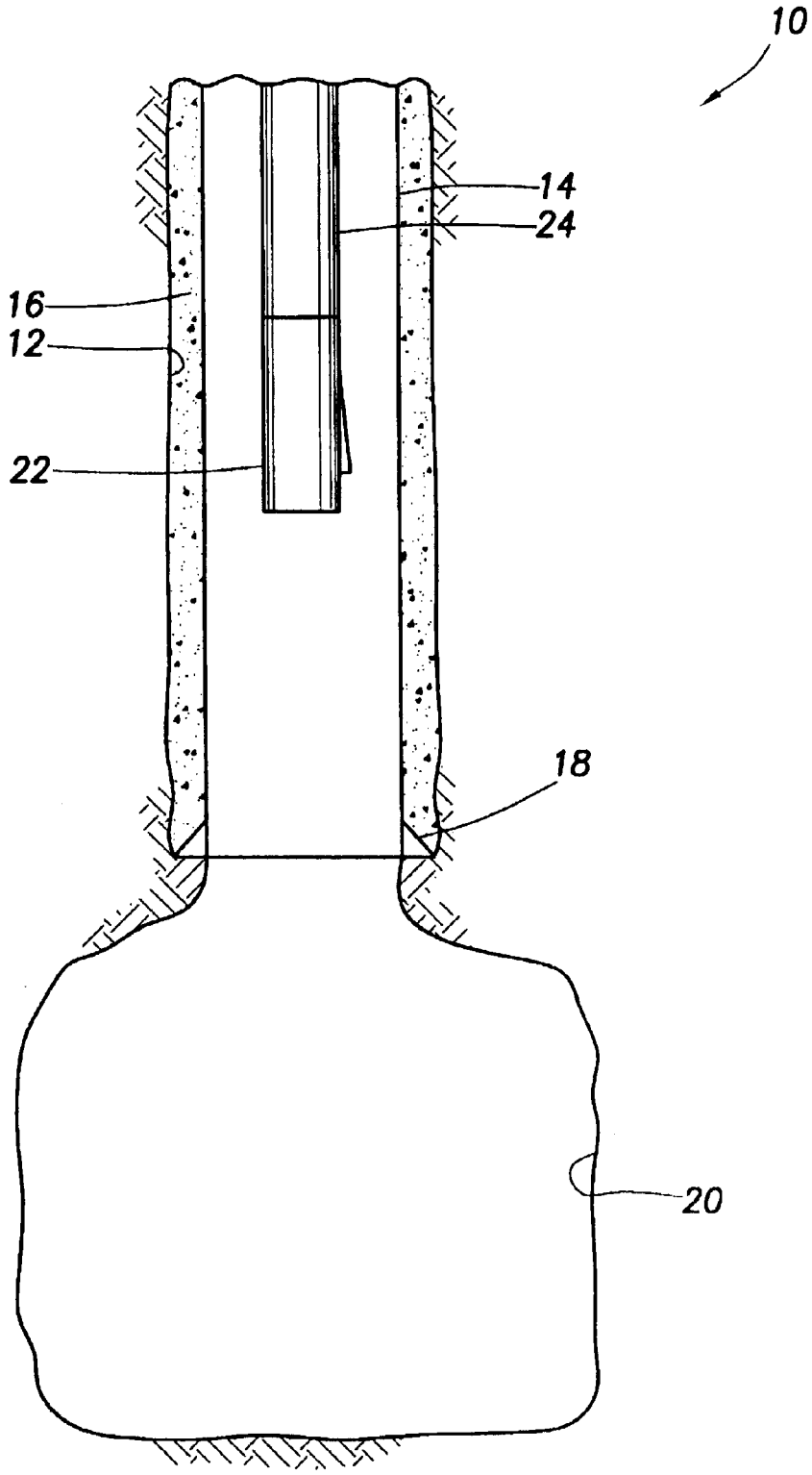
FIGS. 1A–1D are schematic cross-sectional views of a first method of interconnecting wellbores, the method embodying principles of the present invention.

As representatively illustrated in FIG. 1A, initial steps of the method 10 have already been performed. A parent of main wellbore 12 has been drilled from the earth's surface. The parent wellbore 12 has been lined with protective casing 14, and cement 16 has been flowed into the annular space between the casing and the wellbore above a casing shoe 18 at the lower end of the casing. It is, however, to be clearly understood that it is not necessary for the wellbore 12 to extend directly to the earth's surface. Principles of the present invention may be incorporated in a method in which the wellbore 12 is actually a lateral wellbore or branch of another wellbore.

After the casing 14 has been cemented in the wellbore 12, a radially enlarged cavity 20 is formed in the earth below the casing shoe 18. The cavity 20 may be formed by any known procedure, such as by drilling into the earth below the casing shoe 18 and then underreaming, hydraulic jet cutting, explosives, etc. Thus, the cavity 20 may be formed without milling through the casing 14.

Figure 1B:
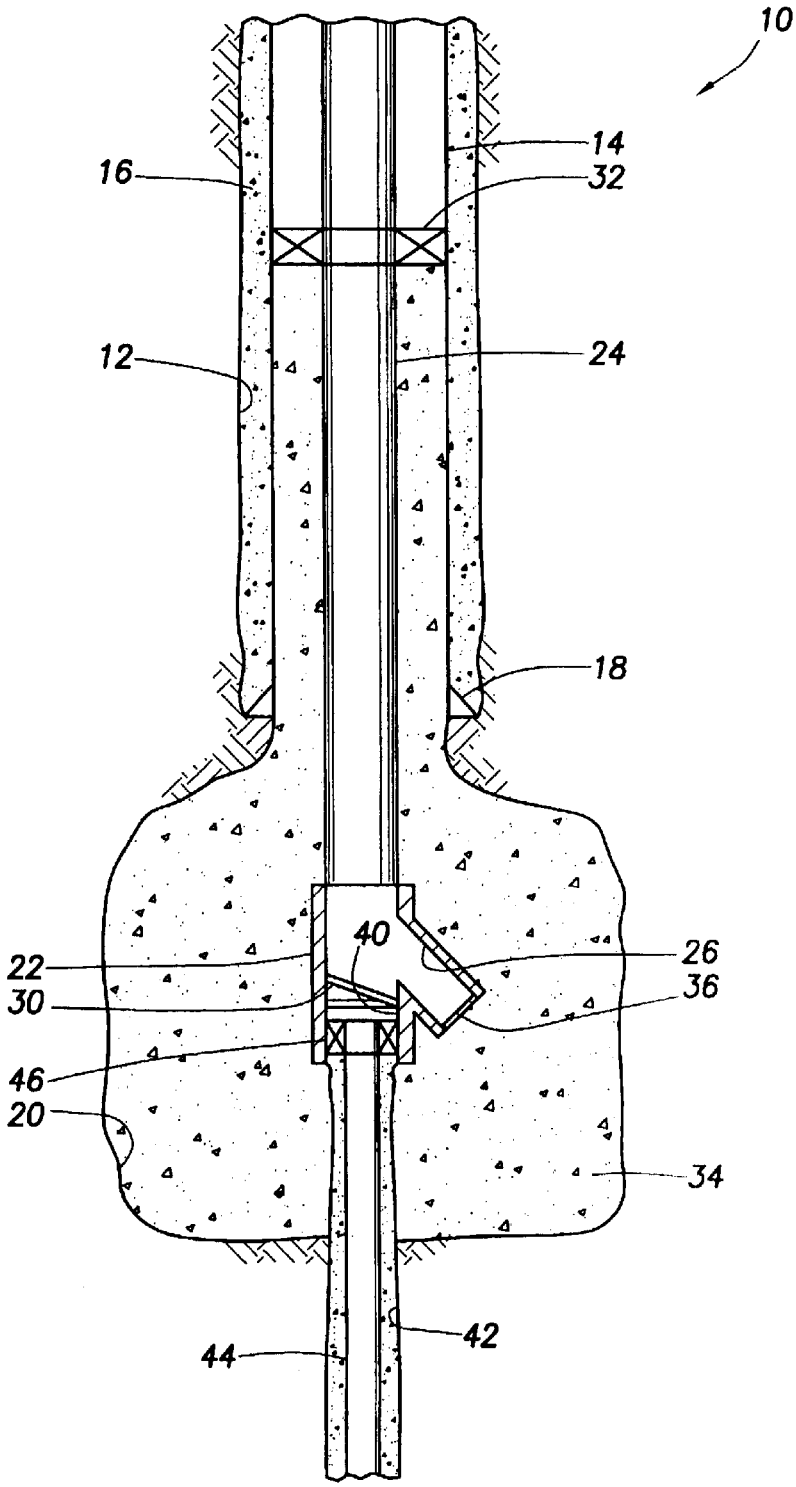

After the cavity 20 has been formed, an expandable wellbore connector 22 is conveyed into the wellbore 12 attached to a tubular string 24. The wellbore connector 22 is of the type which has a collapsed, contracted or retracted configuration as shown in FIG. 1A, which permits it to be conveyed within the dimensional confines of the casing 14, and an extended or expanded configuration as shown in FIG. 1B, which permits it to be interconnected to multiple tubular members, at least one of which extends laterally outwardly therefrom. Examples of wellbore connectors which may be utilized in the method 10 are those described in published European patent application EP0795679A2, published PCT patent application WO 97/06345, and U.S. Pat. No. 5,388,648, the disclosures of which are incorporated herein by this reference. Other wellbore connectors, and other types of wellbore connectors, may be utilized in the method 10 without departing from the principles of the present invention.

Referring now to FIG. 1B, the wellbore connector 22 is positioned within the cavity 20. The wellbore connector 22 is oriented with respect to the wellbore 12, so that its lateral flow passage 26, when expanded or extended, will be directed toward a desired lateral or branch wellbore 28 (see FIG. 1C). This orientation of the wellbore connector 22 may be accomplished by any known procedure, such as by using a gyroscope, high-side indicator, etc. An orienting profile 30 may be formed in, or otherwise attached to, the wellbore connector 22 to aid in the orienting operation.

The wellbore connector 22 is expanded or extended, so that at least one lateral flow passage 26 extends outwardly therefrom. If desired, the lateral flow passage 26 may be swaged or otherwise made to conform to a cylindrical or other shape, to enhance the ability to later attach and/or seal tubular members thereto, pass tubular members therethrough, etc.

With the wellbore connector 22 positioned in the cavity 20, oriented with respect to the lateral wellbore 28 to be drilled, and the lateral flow passage 26 extended, cement 34 is flowed into the cavity and within the casing 14 below a packer 32 of the tubular string 24. The packer 32 is set in the casing 14 after the cement 34 is flowed into the cavity 20. A closure 36 may be utilized to prevent the cement 34 from flowing into the wellbore connector 22. A similar or different type of closure, or a cementing shoe, may be utilized to prevent the cement from flowing into a lower axial flow passage 40.

When the cement 34 has hardened, the parent wellbore 12 may be extended by lowering a drill or cutting tool, such as the cutting tool 38 shown in FIG. 1C, through the tubular string 24 and the wellbore connector 22, and drilling through the cement 34 and into the earth below the cavity 20. In this manner, a lower parent wellbore 42 may be formed extending axially or longitudinally from the wellbore connector 22. If, however, the flow passage 40 is other than axially or longitudinally directed, the wellbore 42 may also be other than axially or longitudinally directed as desired.

A liner, casing or other tubular member 44 is then conveyed into the wellbore 42. The tubular member 44 is cemented in the wellbore 42 and sealingly attached to the wellbore connector 22 at the flow passage 40 utilizing a sealing device 46. The sealing device 46 may be a packer, liner hanger, or any other type of sealing device, including a sealing device described more fully below.

At this point, the lower point wellbore 42 may be completed if desired. For example, the tubular member 44 may be perforated opposite a formation intersected by the wellbore 42 from which, or into which, it is desired to produce or inject fluid. Alternatively, completion of the wellbore 42 may be delayed until after drilling of the lateral wellbore 28, or performed at some other time.

Figure 1C:
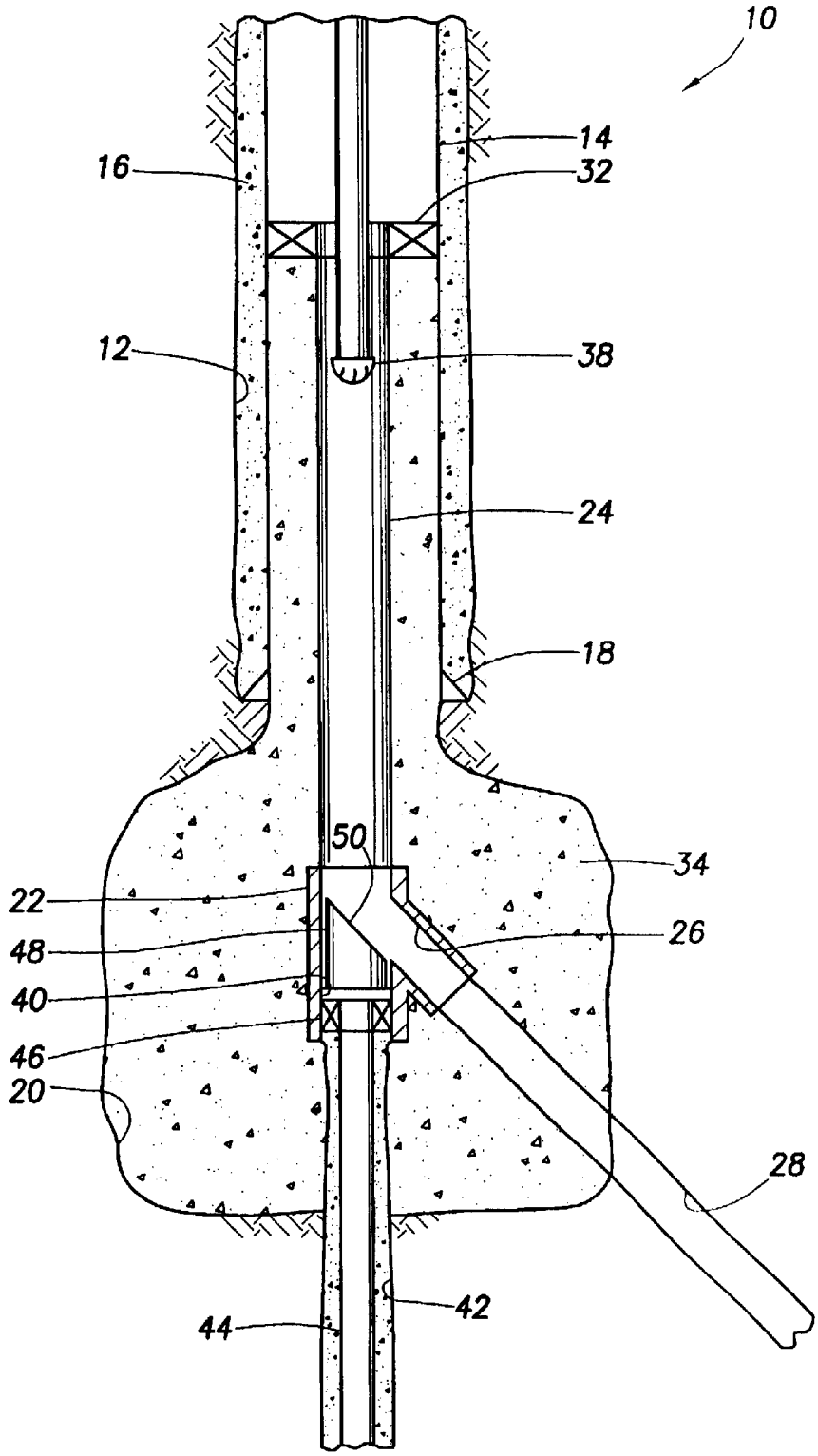

Referring now to FIG. 1C, a deflection device 48 having an upper laterally inclined deflection surface 50 formed thereon is installed within the wellbore connector 22. The deflection device 48 is lowered through the tubular string 24, into the wellbore connector 22, and engaged with the orienting profile 30 (not visible in FIG. 1C). The orienting profile 30 causes the deflection surface 50 to face toward the lateral flow passage 26.

The cutting tool 38 is then lowered through the tubular string 24. The deflection surface 50 deflects the cutting tool 38 laterally into and through the lateral flow passage 26. The lateral wellbore 28 is, thus, drilled by passing the cutting tool 38 through the wellbore connector 22.

Figure 1D:
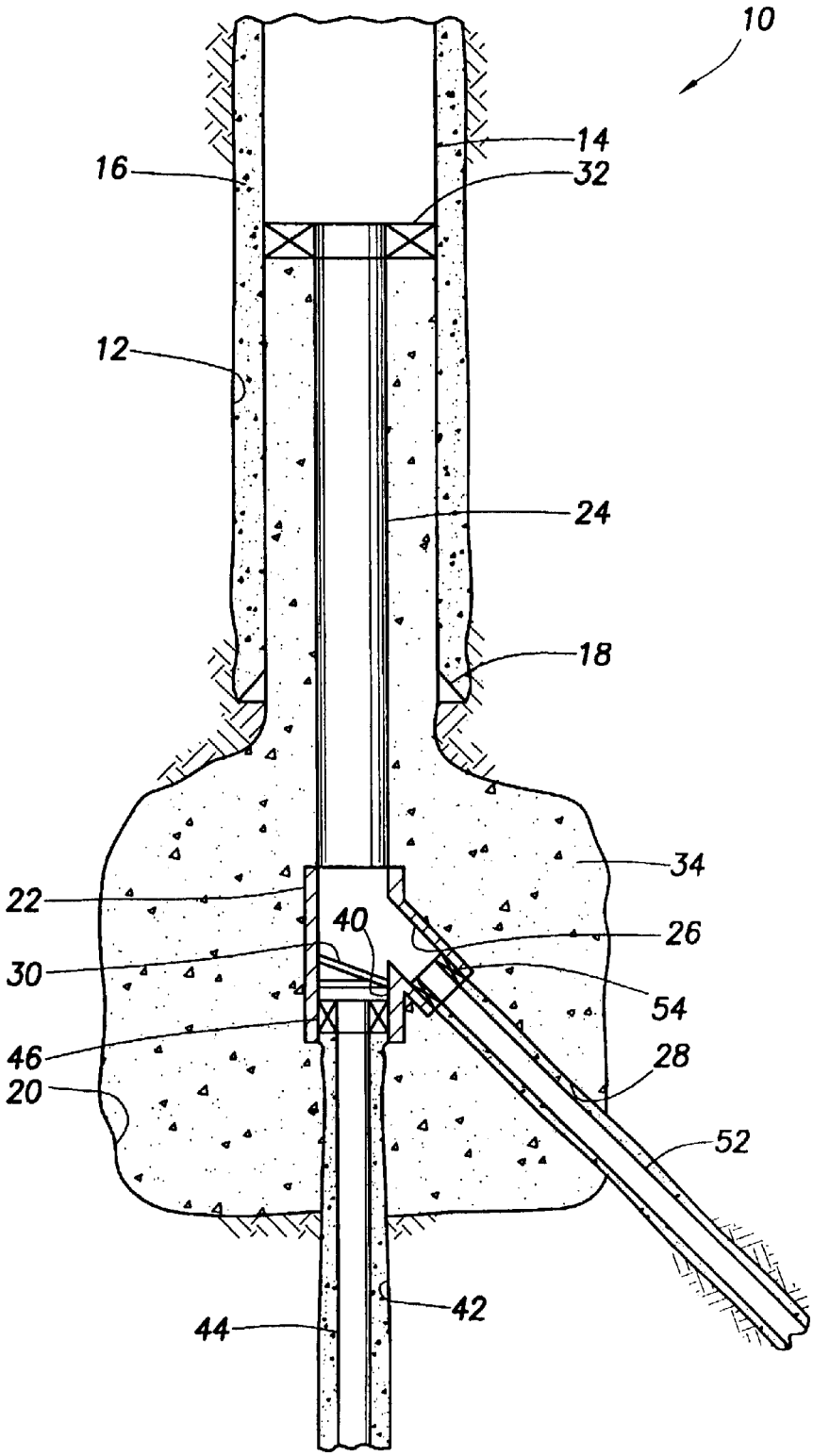

Referring now to FIG. 1D, a liner, casing or other tubular member 52 is lowered through the wellbore connector 22 and deflected laterally by the deflection device 48 through the flow passage 26 and into the lateral wellbore 28. The tubular member 52 is cemented in the wellbore 28 and sealingly attached to the wellbore connector 22 at the flow passage 26 utilizing a sealing device 54. The sealing device 54 may be a packer, liner hanger, or any other type of sealing device, including a sealing device described more fully below.

At this point, the lateral wellbore 28 may be completed if desired. For example, the tubular member 52 may be perforated opposite a formation intersected by the wellbore 28 from which, or into which, it is desired to produce or inject fluid. Alternatively, completion of the wellbore 28 may be delayed until some other time.

The deflection device 48 is retrieved from the wellbore connector 22. However, the deflection device 48 may be installed in the wellbore connector 22 again at any time it is desired to pass tools, equipment, etc. from the tubular string 24 into the tubular member 52.

It may now be fully appreciated that the method 10 provides a convenient and efficient manner of interconnecting the wellbores 42, 28. The tubular members 44, 52 being cemented in the wellbores 42, 28 and sealingly attached to the wellbore connector 22, which is cemented within the cavity 20, prevents migration of fluid between the wellbores 12, 42, 28. The tubular string 24 and tubular members 44, 52 being sealingly attached to the wellbore connector 22 prevents communication between the fluids conveyed through the tubular members and the tubular string, and any earthen formation intersected by the wellbores 12, 42, 28 (except where the tubular members may be perforated or otherwise configured for such fluid communication).

Referring additionally now to FIGS. 2A–2D, another method 60 of interconnecting wellbores is representatively illustrated. The method 60 is similar in many respects to the method 10 described above. However, the method 60 may be utilized where it is not desired to position the wellbore junction below casing lining a parent wellbore.

Figure 2A:
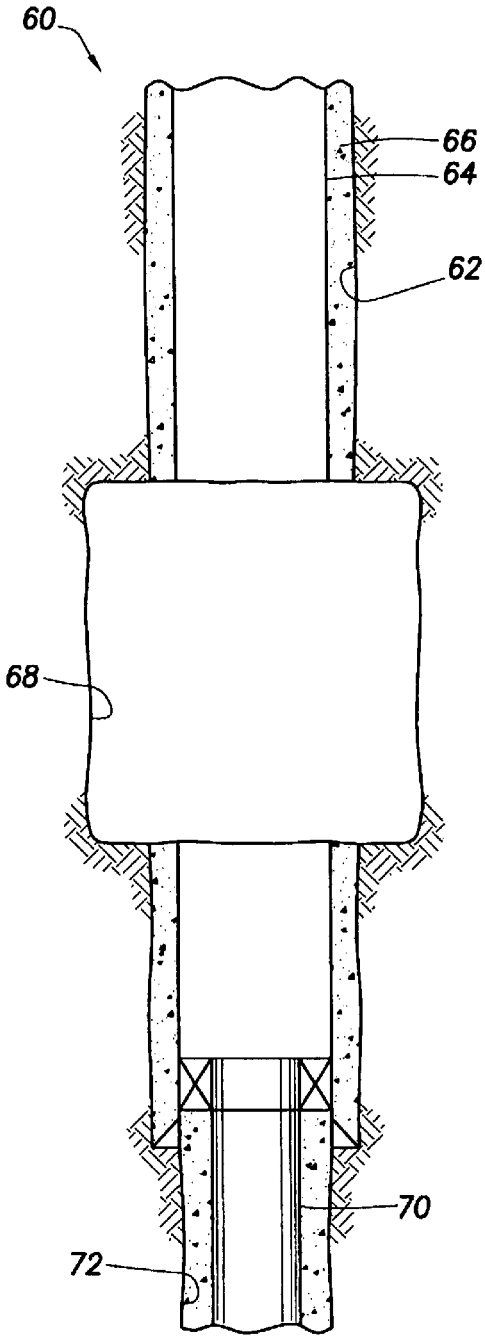
FIGS. 2A–2D are schematic cross-sectional views of a second method of interconnecting wellbores, the method embodying principles of the present invention.

Referring specifically to FIG. 2A, initial steps of the method 60 have been performed. A parent or main wellbore 62 has been drilled from the earth's surface. The parent wellbore 62 has been lined with protective casing 64, and cement 66 has been flowed into the annular space between the casing and wellbore. It is, however, to be clearly understood that it is not necessary for the wellbore 62 to extend directly to the earth's surface. Principles of the present invention may be incorporated in a method in which the wellbore 62 is actually a lateral wellbore or branch of another wellbore.

After the casing 64 has been cemented in the wellbore 62, a radially enlarged cavity 68 is formed extending radially outward from the casing. The cavity 68 may be formed by any known procedure, such as by underreaming, section milling, hydraulic jet cutting, explosives, etc., or a combination of known procedures, such as section milling followed by jet cutting, etc. Thus, the cavity 68 is formed through the casing 64 and outward into or through the cement 66 surrounding the casing. The cavity 68 may also extend into the earth surrounding the cement 66 as representatively illustrated in FIG. 2A.

A liner, casing or other tubular member 70 may be installed in a lower parent wellbore 72 and cemented therein. This operation may be performed before or after the cavity 68 is formed. Alternatively, the tubular member 70 may be conveyed into the lower parent wellbore 72 at the same time as an expandable wellbore connector 74 is positioned in the cavity 68 (see FIG. 2B). As another alternative, the tubular member 70 may be installed after the wellbore connector 74 is cemented within the cavity 68, as described above for the method 10 in which the tubular member 44 was installed in the lower parent wellbore 42 drilled after the cement 34 hardened. Of course, the tubular member 44 could also be installed in the method 10 using any of the procedures described for the tubular member 70 in the method 60.

Figure 2B:
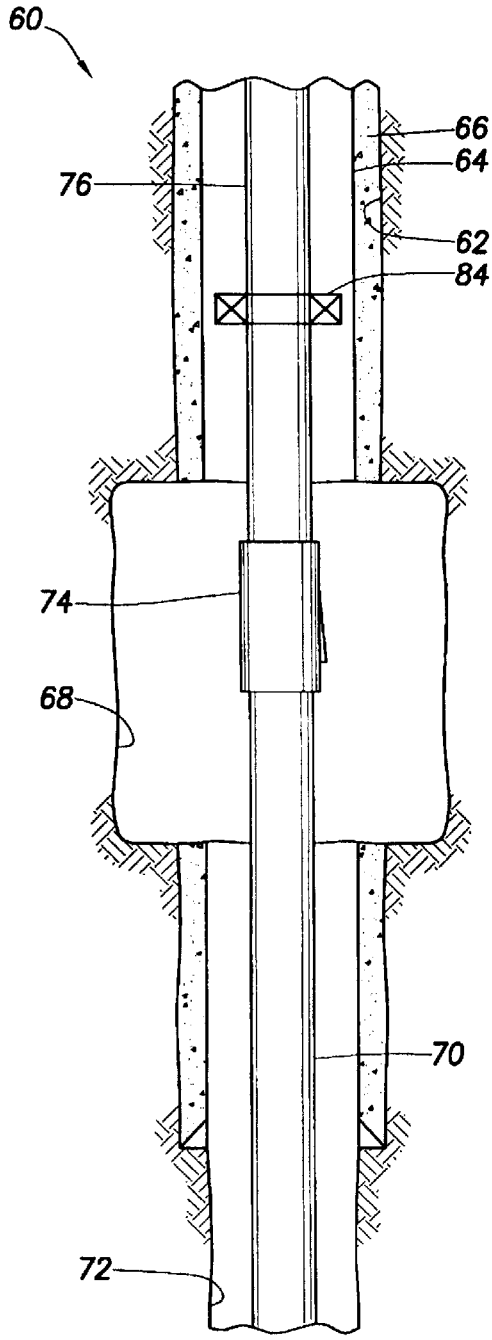

Referring now to FIG. 2B, the wellbore connector 74 is conveyed into the wellbore 62 attached to a tubular string 76. As respectively illustrated in FIG. 2B, the tubular member 70 is conveyed into the lower parent wellbore 72 as a portion of the tubular string 76, it being understood that the tubular member 70 could have already have been installed therein as shown in FIG. 2A, or could be installed later as described above for the tubular member 44 in the method 10. The wellbore connector 74 is similar to the wellbore connector 22 described above. However, other wellbore connectors, and other types of wellbore connectors, may be utilized in the method 60 without departing from the principles of the present invention.

The wellbore connector 74 is positioned within the cavity 68. The wellbore connector 74 is oriented with respect to the wellbore 62, so that its lateral flow passage 78, when expanded or extended, will be directed toward a desired lateral or branch wellbore 80 (see FIG. 2C). This orientation of the wellbore connector 74 may be accomplished by any known procedure, such as by using a gyroscope, high-side indicator, etc. An orienting profile 82 (see FIG. 2D) may be formed in, or otherwise attached to, the wellbore connector 74 to aid in the orienting operation. When the wellbore connector 74 has been properly oriented, a packer 84 of the tubular string 76 is set in the casing 64.

Figure 2C:
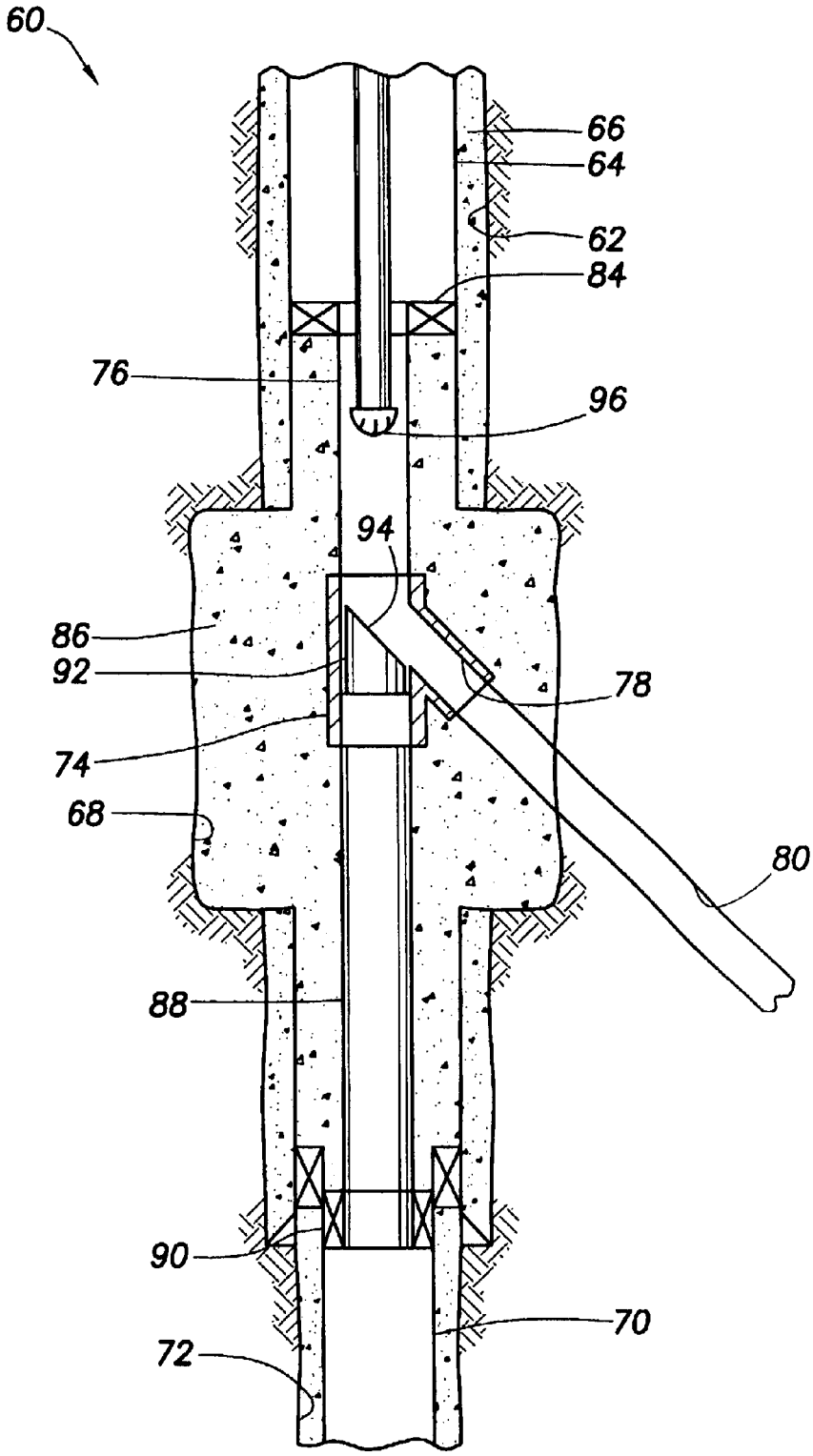

Referring now to FIG. 2C, the wellbore connector 74 is expanded or extended, so that at least one lateral flow passage 78 extends outwardly therefrom. If desired, the lateral flow passage 78 may be swaged or otherwise made to conform to a cylindrical or other shape, to enhance the ability to later attach and/or seal tubular members thereto, pass tubular members therethrough, etc.

FIG. 2C shows an alternative method of interconnecting the wellbore connector 74 to the tubular member 70. Another tubular member 88 is conveyed into the well already attached to the wellbore connector 74. The tubular member 88 is sealingly engaged with the tubular member 70 when the wellbore connector 74 is positioned within the cavity 68. For example, the tubular member 88 may carry a sealing device 90 thereon for sealing engagement with the tubular member 70, such as a packing stack which is stabbed into a polished bore receptacle attached to the tubular member, etc. Alternatively, the sealing device 90 may be a conventional packer or a sealing device of the type described more fully below.

With the wellbore connector 74 positioned in the cavity 68, oriented with respect to the lateral wellbore 80 to be drilled, and the lateral flow passage 78 extended, cement 86 is flowed into the cavity surrounding the wellbore connector 74. Of course, the packer 84 may be unset during the cementing operation and then set thereafter. One or more closures, such as the closure 36 described above, may be used to exclude cement from the flow passage 78 and/or other portions of the wellbore connector 74.

When the cement 86 has hardened, the parent wellbore 62 may be extended if it has not been previously extended. This operation may be performed as described above for the method 10, or it may be accomplished by any other procedure. If the lower parent wellbore 72 is drilled after the wellbore connector 74 is positioned and cemented within the cavity 68, the tubular member 70 is then installed and cemented therein.

At this point, the lower parent wellbore 72 may be completed if desired. For example, the tubular member 70 may be perforated opposite a formation intersected by the wellbore 72 from which, or into which, it is desired to produce or inject fluid. Alternatively, completion of the wellbore 72 may be delayed until after drilling of the lateral wellbore 80, or performed at some other time.

A deflection device 92 having an upper laterally inclined deflection surface 94 formed thereon is installed within the wellbore connector 74. The deflection device 92 is lowered through the tubular string 76, into the wellbore connector 74, and engaged with the orienting profile 82 (not visible in FIG. 2C, see FIG. 2D). The orienting profile 82 causes the deflection surface 94 to face toward the lateral flow passage 78.

A cutting tool 96 is then lowered through the tubular string 76. The deflection surface 94 deflects the cutting tool 96 laterally into and through the lateral flow passage 78. The lateral wellbore 80 is, thus, drilled by passing the cutting tool 96 through the wellbore connector 74.

Figure 2D:
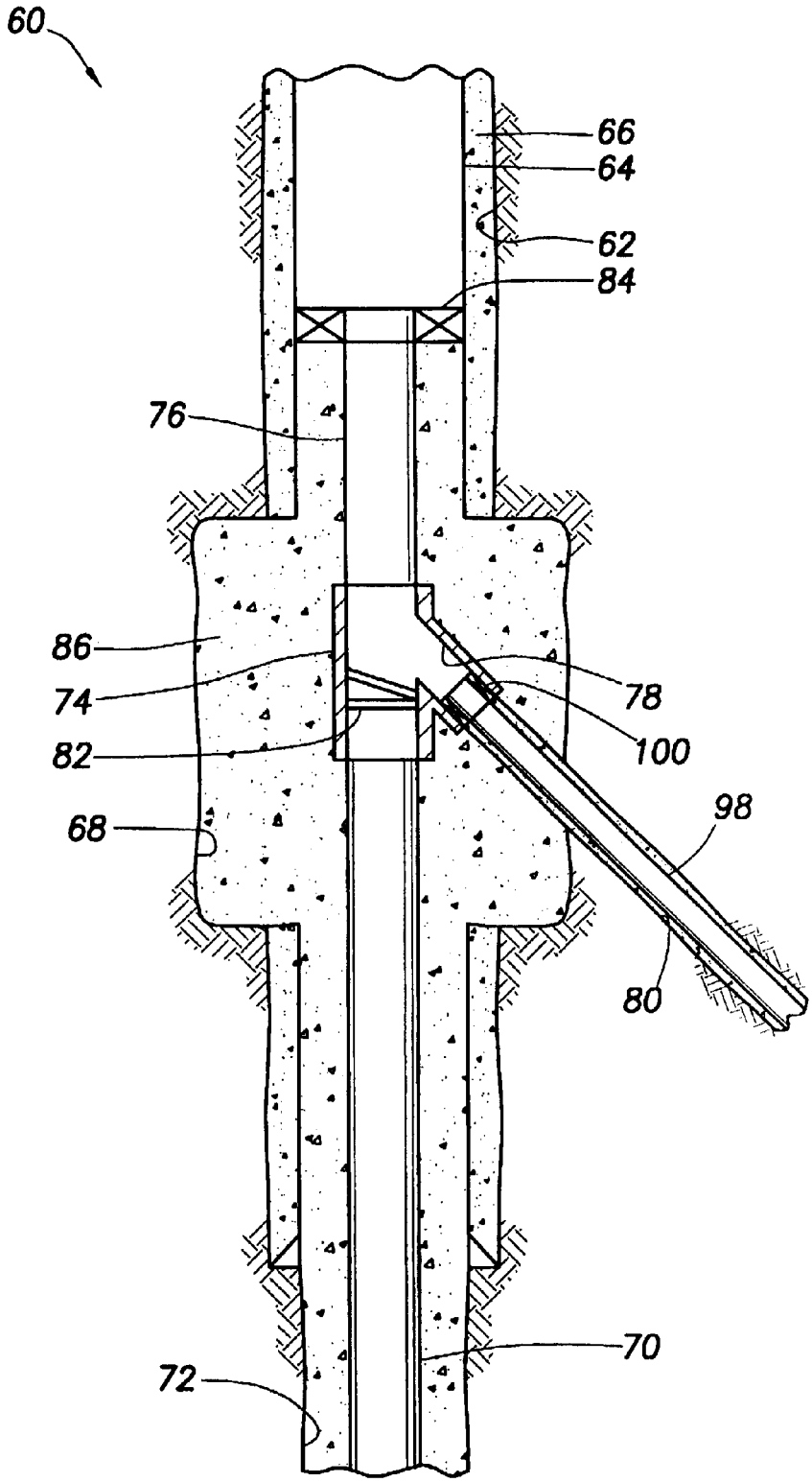

Referring now to FIG. 2D, a liner, casing or other tubular member 98 is lowered through the wellbore connector 74 and deflected laterally by the deflection device 92 through the flow passage 78 and into the lateral wellbore 80. The tubular member 98 is cemented in the wellbore 80 and sealingly attached to the wellbore connector 74 at the flow passage 78 utilizing a sealing device 100. The sealing device 100 may be a packer, liner hanger, or any other type of sealing device, including a sealing device described more fully below.

Note that FIG. 2D shows the tubular member 70 as if it was conveyed into the well attached to the wellbore connector 74, as described above in relation to the alternate method 60 as shown in FIG. 2B. In this case, the tubular member 70 may be cemented within the lower parent wellbore 72 at the same time the wellbore connector 74 is cemented within the cavity 68.

At this point, the lateral wellbore 80 may be completed if desired. For example, the tubular member 98 may be perforated opposite a formation intersected by the wellbore 80 from which, or into which, it is desired to produce or inject fluid. Alternatively, completion of the wellbore 80 may be delayed until some other time.

The deflection device 92 is retrieved from the wellbore connector 74.

However, the deflection device 92 may be installed in the wellbore connector 74 again at any time it is desired to pass tools, equipment, etc. from the tubular string 76 into the tubular member 98.

It may now be fully appreciated that the method 60 provides a convenient and efficient manner of interconnecting the wellbores 72, 80. The tubular members 70, 98 being cemented in the wellbores 72, 80 and sealingly attached to the wellbore connector 74, which is cemented within the cavity 68, prevents migration of fluid between the wellbores 62, 72, 80. The tubular string 76 and tubular members 70, 98 being sealingly attached to the wellbore connector 74 prevents communication between the fluids conveyed through the tubular members and the tubular string, and any earthen formation intersected by the wellbores 62, 72, 80 (except where the tubular members may be perforated or otherwise configured for such fluid communication).

Figure 3B:
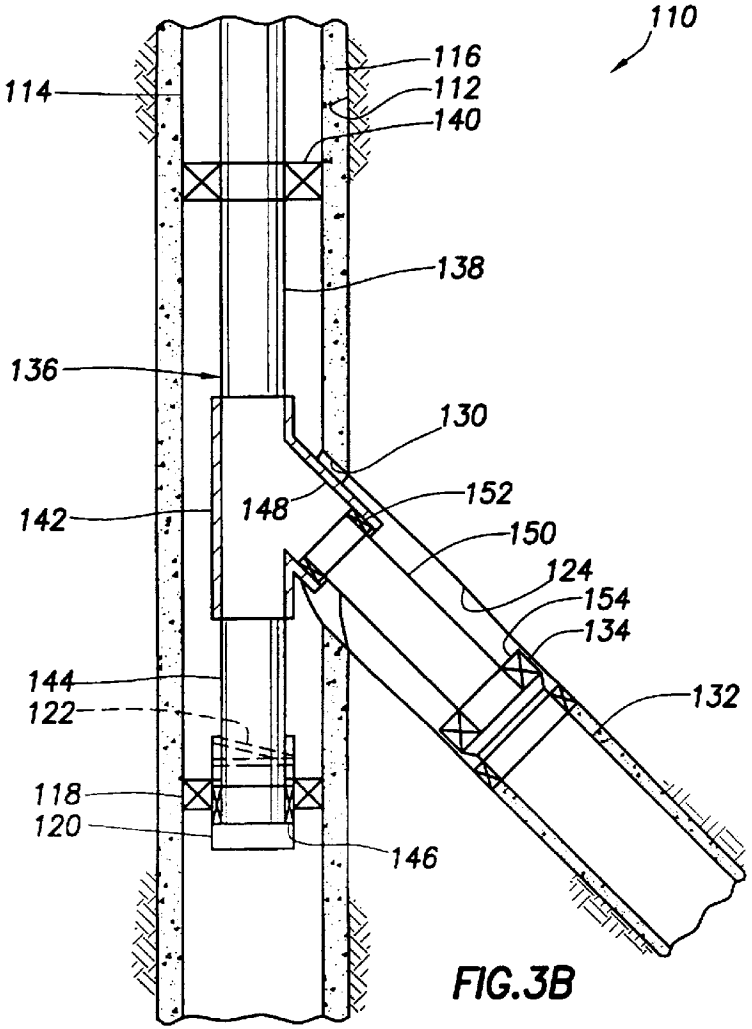
FIGS. 3A–3B are schematic cross-sectional views of a third method of interconnecting wellbores, the method embodying principles of the present invention.
Figure 3A:
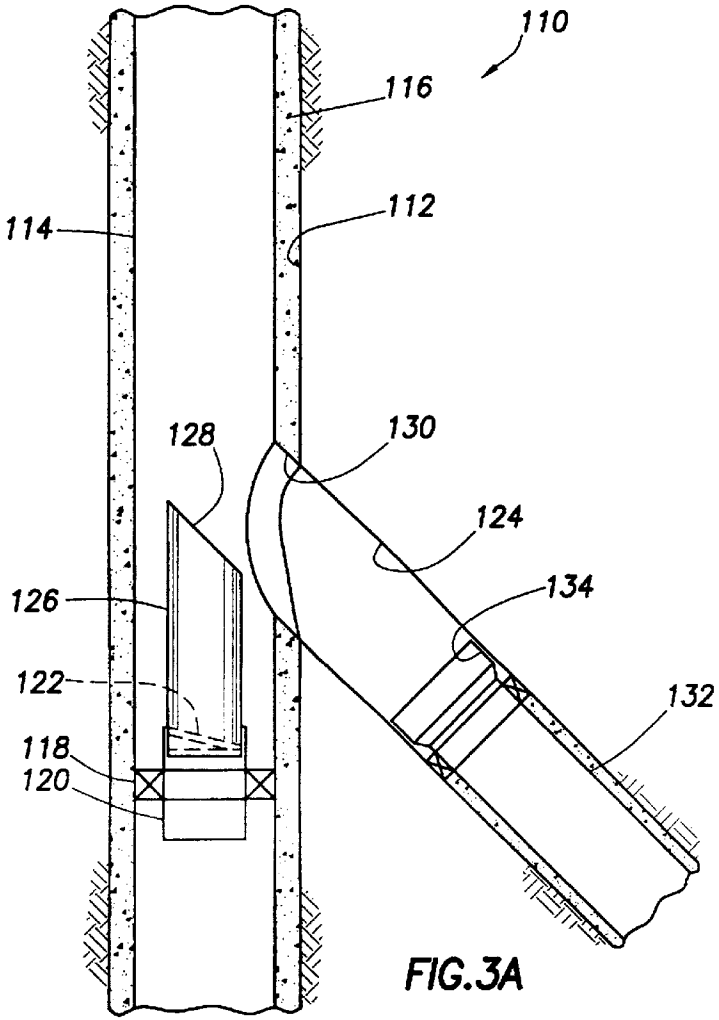

Referring additionally now to FIGS. 3A&3B, another method of interconnecting wellbores 110 is representatively illustrated. The method 110 differs from the previously described methods 10, 60 in large part in that wellbores interconnected utilizing an expandable wellbore connector are not drilled, in whole or in part, through the wellbore connector.

As shown in FIG. 3A, a parent or main wellbore 112 has protective casing 114 installed therein. Cement 116 is flowed in the annular space between the casing 114 and the wellbore 112 and permitted to harden therein. A packer 118 having a tubular member 120 sealingly attached therebelow and 16 an orienting profile 122 attached thereabove is conveyed into the wellbore 112. It is to be clearly understood, however, that it is not necessary for these elements to be separately formed, for the elements to be positioned with respect to each other as shown in FIG. 3A, or for all of these elements to be simultaneously conveyed into the wellbore 112. For example, the tubular member 120 may be a mandrel of the packer 118, may be a polished bore receptacle attached to the packer, the orienting profile 122 may be otherwise positioned, or it may be formed directly on the tubular member 120 or packer 118, etc.

The packer 118, tubular member 120 and orienting profile 122 are positioned in the parent wellbore 112 below an intersection of the parent wellbore and a lateral or branch wellbore 124, which has not yet been drilled. The packer 118, tubular member 120 and orienting profile 122 are oriented with respect to the lateral wellbore 124 and the packer is set in the casing 114.

A deflection device or whipstock 126 is then conveyed into the well and engaged with the orienting profile 122. The orienting profile 122 causes an upper laterally inclined deflection surface 128 formed on the deflection device 126 to face toward the lateral wellbore-to-be-drilled 124. Alternatively, the deflection device 126 could be conveyed into the well along with the packer 118, tubular member 120 and orienting profile 122.

In a window milling operation well known to those skilled in the art, at least one cutting tool, such as a window mill (not shown) is conveyed into the well and laterally deflected off of the deflection surface 128. The cutting tool forms a window or opening 130 through the casing 114. One or more additional cutting tools, such as drill bits (not shown), are then utilized to drill outwardly from the opening 130, thereby forming the lateral wellbore 124.

A liner, casing or other tubular member 132 is lowered into the lateral wellbore 124 and cemented therein. The liner 132 may have a polished bore receptacle 134 or other seal surface at an upper end thereof. The deflection device 126 is then retrieved from the well.

Referring now to FIG. 3B, an assembly 136 is conveyed into the well. The assembly 136 includes an upper tubular member 138, a packer 140 sealingly attached above the tubular member 138, an expandable wellbore connector 142, a lower tubular member 144 sealingly attached below the wellbore connector, and a sealing device 146 carried at a lower end of the tubular member 144. The wellbore connector 142 is sealingly interconnected between the tubular members 138, 144. The wellbore connector 142 may be similar to the wellbore connectors 22, 74 described above, and the sealing device 146 may be any type of sealing device, such as packing, a packer, a sealing device described more fully below, etc.

When conveyed into the well, the wellbore connector 142 is in its contracted configuration, so that it is conveyable through the casing 114 or other restriction in the well. The tubular member 144 engages the orienting profile, causing the wellbore connector to be rotationally oriented relative to the lateral wellbore 124, that is, so that a lateral flow passage 148 of the wellbore connector, when extended, faces toward the lateral wellbore. At this point, the sealing device 146 may be sealingly engaged within the packer 118 or tubular member 120, for example, if the sealing device 146 is a packing stack it may be stabbed into a polished bore receptacle as the tubular member 144 is engaged with the orienting profile 122. Alternatively, if the sealing device is a packer or other type of sealing device, it may be subsequently set within, or otherwise sealingly engaged with, the packer 118 or tubular member 120. The packer 140 may be set in the casing 114 once the wellbore connector 142 has been oriented with respect to the lateral wellbore 124.

The wellbore connector 142 is extended or expanded, so that the lateral flow passage 148 extends outwardly toward the lateral wellbore 124. A portion of the wellbore connector 142 may extend into or through the opening 130.

A tubular member 150 is conveyed through the wellbore connector 142 and outward through the lateral flow passage 148. This operation may be accomplished as described above, that is, by installing a deflection device within the wellbore connector 142 to laterally deflect the tubular member 150 through the lateral flow passage 148. Of course, other methods of conveying the tubular member 150 may be utilized without departing from the principles of the present invention.

The tubular member 150 has sealing devices 152, 154 carried at upper and lower ends thereof for sealing engagement with the wellbore connector 142 and tubular member 132, respectively. The sealing devices 152, 154, or either of them, may be of any of the types described above, or one or both of them may be of the type described more fully below. If the tubular member 132 has the polished bore receptacle 134 at its upper end, the sealing device 154 may be a packing stack and may be sealingly engaged with the polished bore receptacle when the tubular member 150 is displaced outwardly from the lateral flow passage 148.

With the sealing device 146 sealingly engaged with the packer 118 or tubular member 120, the packer 140 set within the casing 114, and the tubular member 150 sealingly interconnected between the wellbore connector 142 and the tubular member 132, undesirable fluid migration and fluid communication are prevented. The wellbores 112, 124 may be completed as desired. Note that cement (not shown), or another cementitious material or other material with appropriate properties, may be placed in the space surrounding the wellbore connector 142 if desired, to strengthen the wellbore junction and for added protection against undesirable fluid migration and fluid communication.

Figure 4B:
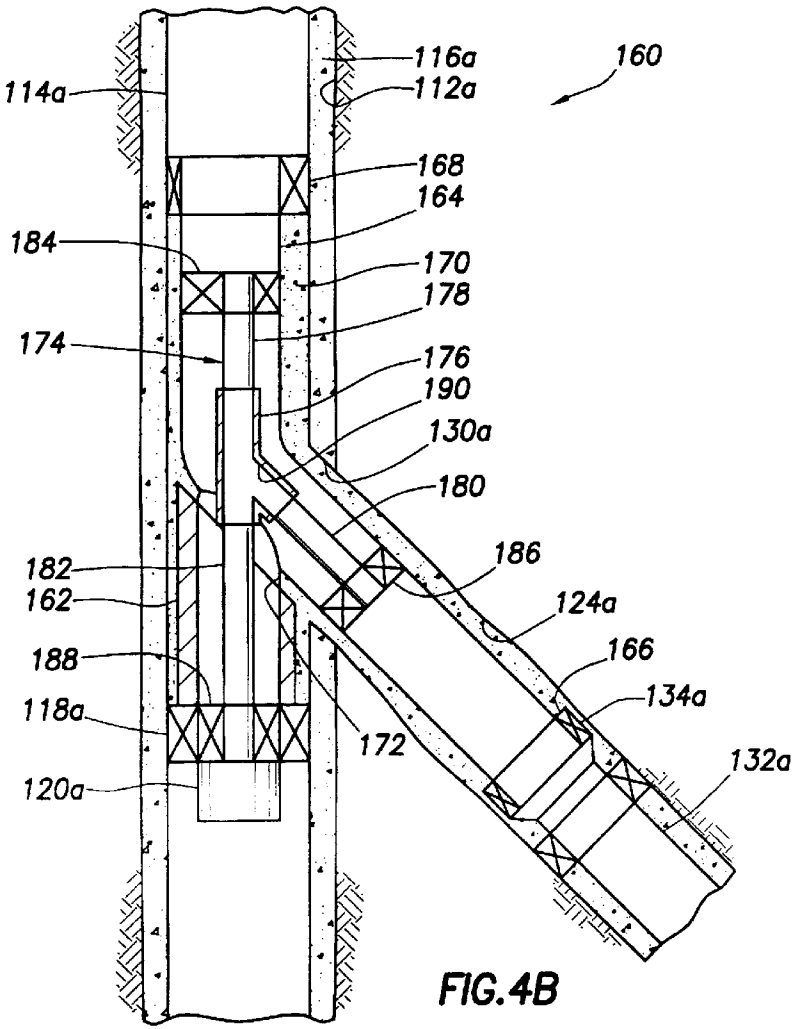
FIGS. 4A–4B are schematic cross-sectional views of a fourth method of interconnecting wellbores, the method embodying principles of the present invention.
Figure 4A:
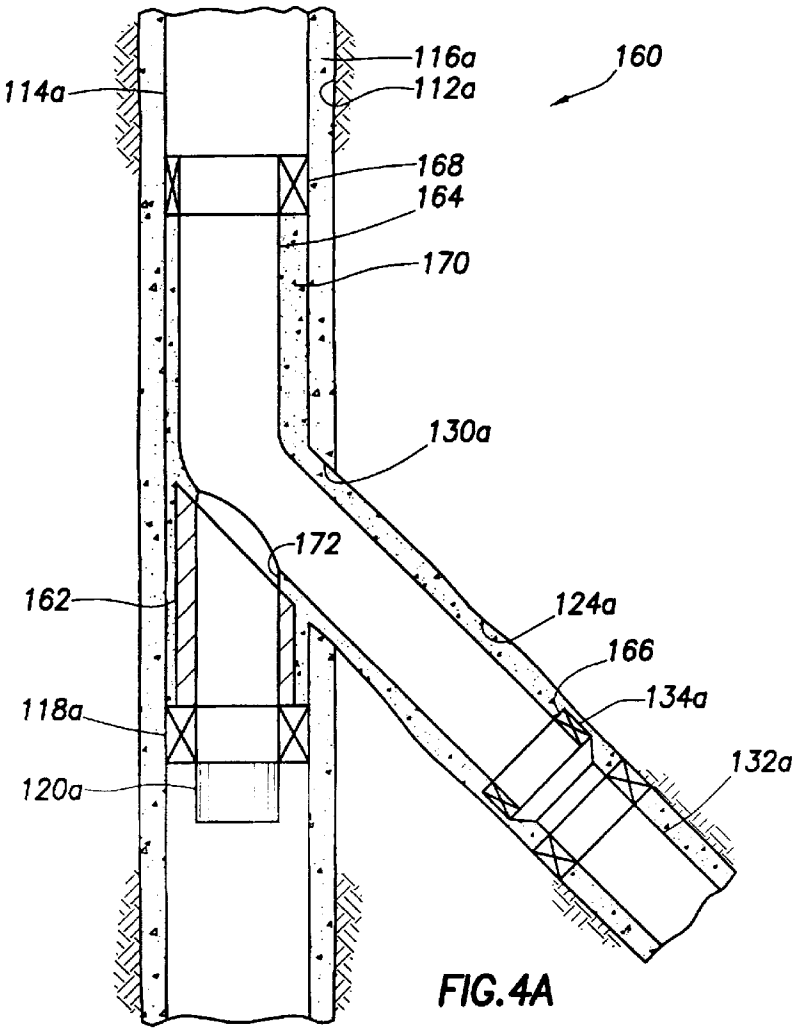

Referring additionally now to FIGS. 4A&4B another method of interconnecting wellbores 160 is representatively illustrated. The method 160 is similar in many respects to the method 110 described above. Elements which are similar to those previously describe are indicated in FIGS. 4A&4B using the same reference numbers, with an added suffix "a".

In FIG. 4A it may be seen that the lateral wellbore 124a has been drilled by deflecting one or more cutting tools off of a whipstock 162 attached above the packer 118a. The whipstock 162 may be hollow, it may have an outer case and an inner core, the inner core being relatively easily drilled through, etc. Note, also, that the whipstock is oriented with respect to the lateral wellbore 124a without utilizing an orienting profile.

After the lateral wellbore 124a has been drilled, the tubular member 132a is positioned and cemented therein. Another liner, casing or other tubular member 164 is then conveyed into the well, and a lower end thereof laterally deflected into the lateral wellbore 124a A sealing device 166 carried on the tubular member 164 lower end sealingly engages the tubular member 132a, and a packer, liner hanger, or other sealing and/or anchoring device 168 carried on the tubular member 164 upper end is set within the casing 114a.

The tubular member 164 is then cemented within the parent and lateral wellbores 112a, 124a. Of course, the cement 170 may be placed surrounding the tubular member 164 before either or both of the sealing devices 168, 166 are sealingly engaged with the casing 1 14a and tubular member 132a, respectively.

Note that, although the tubular members 164, 132a are shown in FIGS. 4A&4B as being separately conveyed into the well and sealingly engaged therein, it is to be clearly understood that the tubular members 164, 132a may actually be conveyed into the well already attached to each other, or they may be only a single tubular member, without departing from the principles of the present invention.

When the cement 170 has hardened, a cutting tool (not shown) is used to form an opening 172 through a portion of the tubular member 164 which overlies the whipstock 162 and extends laterally across the parent wellbore 112a The opening 172 is formed through the tubular member 164 and cement 170, and also through the whipstock 162 inner core.

Referring now to FIG. 4B, an assembly 174 is conveyed into the tubular member 164. The assembly 174 includes an expandable wellbore connector 176, tubular members 178, 180, 182, and sealing devices 184, 186, 188. Each of the tubular members 178, 180, 182 is sealingly interconnected between a corresponding one of the sealing devices 184, 186, 188 and the wellbore connector 176. The tubular member 180 and sealing device 186 connected at a lateral flow passage 190 of the wellbore connector 176 may be retracted or contracted with the lateral flow passage to permit their conveyance through the casing 1 14a and tubular member 164.

Alternatively, the representatively illustrated elements 176, 178, 180, 182, 184, 186, 188 of the assembly 174 may be conveyed separately into the tubular member 164 and then interconnected therein, various subassemblies or combinations of these elements may be interconnected to other subassemblies, etc. For example, the sealing device 188 and tubular member 182 may be initially installed in the well and the sealing device sealingly engaged within the packer 118a or tubular member 120a, and then the wellbore connector 176, tubular members 178, 180 and sealing devices 184, 186 may be conveyed into the well, the wellbore connector 176 extended or expanded, the wellbore connector sealingly engaged with the tubular member 182, and the sealing devices 184, 186 sealingly engaged within the tubular member 164. As another example, the sealing device 186 and tubular member 180 may be installed in the tubular member 164 before the remainder of the assembly 174. Thus, the sequence of installation of the elements of the assembly 174, and the combinations of elements installed in that sequence, may be varied without departing from the principles of the present invention.

The wellbore connector 176 is oriented within the tubular member 164, so that the lateral flow passage 190 is directed toward the lateral wellbore 124a. For this purpose, an orienting profile (not shown) may be attached to the packer 118a as described above. The sealing devices 184, 188 are sealingly engaged within the tubular member 164, and the tubular member 120a and/or packer 118a, respectively.

The wellbore connector 176 is expanded or extended, the tubular member 180 and sealing device 186 extending into the tubular member 164 below the opening 172. The sealing device 186 is then sealingly engaged within the tubular member 164. Note that it may be desired to displace the wellbore connector 176 while it is being expanded or extended, to facilitate passage of the tubular member 180 and sealing device 186 into the tubular member 164 below the opening 172, therefore, the sealing devices 184,188 may not be sealingly engaged with the tubular member 164 and packer 118a and/or tubular member 120a, respectively, until after the wellbore connector has been expanded or extended and the sealing device 186 has been sealingly engaged within the tubular member 164.

Referring additionally now to FIGS. 5A–5D, another method of interconnecting wellbores 200 is representatively illustrated. The method 200 utilizes a unique apparatus 202 for forming an opening 204 through casing 206 lining a parent or main wellbore 208.

Figure 5A:
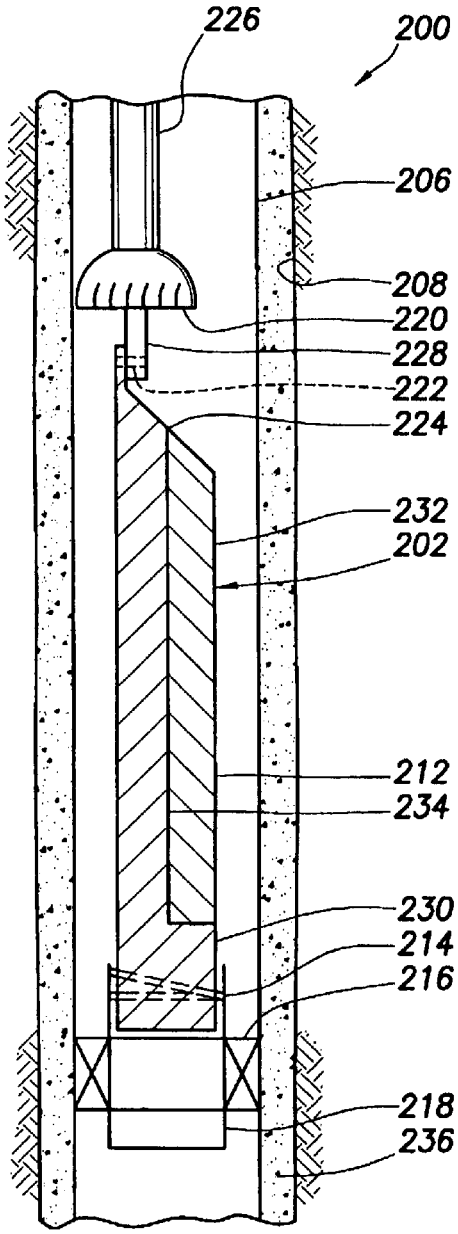
FIGS. 5A–5D are schematic cross-sectional views of a fifth method of interconnecting wellbores and apparatus therefor, the method and apparatus embodying principles of the present invention.

As shown in FIG. 5A, initial steps of the method 200 have been performed. The apparatus 202 is conveyed into the well and positioned adjacent a desired intersection of the parent wellbore 208 and a desired lateral wellbore 210 (see FIG. 5D). The apparatus 202 includes a deflection device or whipstock 212, or orienting profile 214, a packer or other sealing and/or anchoring device 216, a tubular member 218, and a cutting tool or mill 220.

The mill 220 is shown as being attached to the whipstock 212 by means of a shear member 222, but it is to be clearly understood that the mill and whipstock may be otherwise attached, and the mill and whipstock may be separately conveyed into the well, without departing from the principles of the present invention. Similarly, the whipstock 212 is shown as being engaged with the orienting profile 214 as they are conveyed into the well, but the packer 216, orienting profile and tubular member 218 may be conveyed into the well separate from the whipstock and mill 220. The whipstock 212 may be secured relative to the orienting profile 214, packer 216 and/or tubular member 218 using a conventional anchoring device, if desired.

The apparatus 202 is oriented relative to the desired lateral wellbore 210 and the packer 216 is set within the casing 206. With the whipstock engaged with the orienting profile 214, an upper laterally inclined deflection surface 224 of the whipstock 212 faces toward the desired lateral wellbore 210.

Figure 5B:
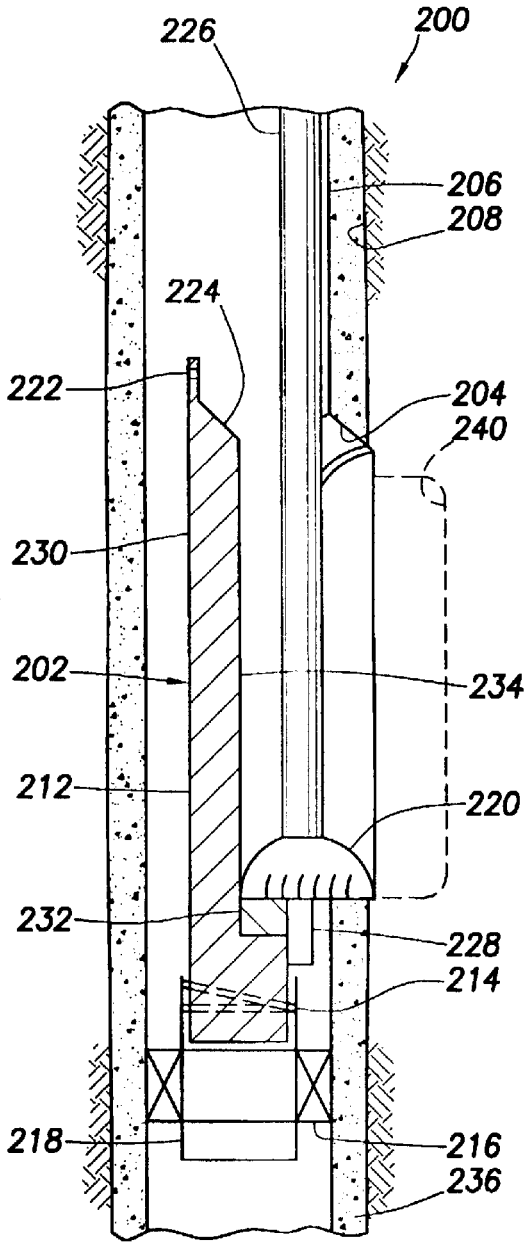

Referring now to FIG. 5B, the mill 220 is displaced downwardly to shear the shear member 222, for example, by applying the weight of a drill string or other tubular string 226 attached thereto to the mill. The mill 220 is rotated as a downwardly extending generally cylindrical guide portion 228 is deflected laterally by the deflection surface 224. Eventually, the mill 220 is displaced downwardly and laterally sufficiently far for the mill in contact and form the opening 204 through the casing 206.

The whipstock 212 includes features which permit the mill 220 to longitudinally extend the opening 204, without requiring the mill 220 to be displaced laterally any more than that needed to cut the opening through the casing 206. Specifically, the whipstock includes a body 230 having a guide layer 232 attached to a generally longitudinally extending guide surface 234. Thus, the mill 220 cuts through the guide layer 232, but does not penetrate the guide surface 234 of the body 230. The guide layer 232 may be made of a material having a hardness substantially less than that of the body 230, thereby permitting the mill 220 to relatively easily cut through the guide layer.

The guide portion 228 bears against the guide layer 232 as the mill 220 is displaced longitudinally downward, thereby preventing the mill from displacing laterally away from the casing 206. The guide portion also prevents the mill 220 from cutting into the guide surface 234. In this manner, the opening 204 is cut through the casing 206 and axially elongated by longitudinally displacing the mill relative to the whipstock 212.

The mill 220 may also cut through cement 236 surrounding the casing 206. The mill 220 may cut the opening 20,4 sufficiently laterally outward that an expandable wellbore connector 238 (see FIG. 5C) may be expanded or extended therein. Alternatively, the opening 20,4 may be enlarged outward to form a cavity 240 using conventional procedures, such as hydraulic jet cutting, etc. in order to provide sufficient space to expand or extend the wellbore connector 238.

After the opening 204 has been formed, the mill 220, drill string 226 and whipstock 212 are retrieved from the well. The mill 220, whipstock 212 and any anchoring device securing the whipstock to the orienting profile 214, packer 216 and/or tubular member 218 may be retrieved together or separately. For example, the mill 220, drill string 226 and whipstock 212 may be retrieved together by picking up on the drill string, causing the mill to engage a structure, such as a ring neck (not shown), attached to the whipstock, which applies an upwardly directed force to the whipstock and disengages the whipstock from the orienting profile 214, packer 216 and/or tubular member 218. The packer 216, orienting profile 214 and tubular member 218, however, remain positioned in the casing 206 as shown in FIG. 5B.

Figure 5D:
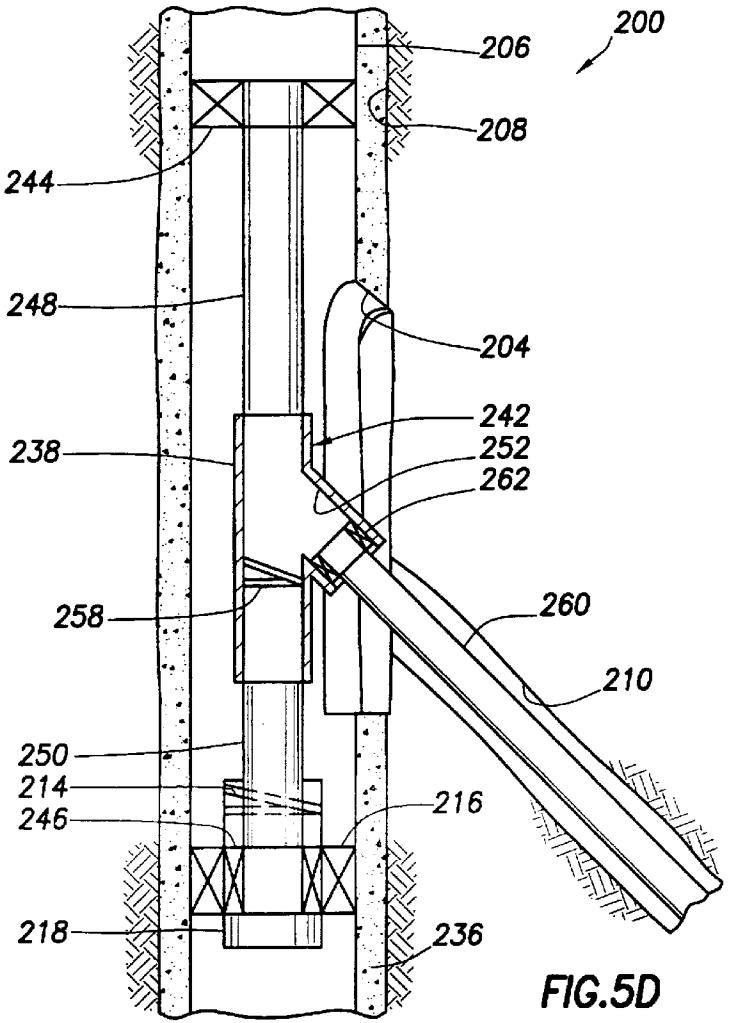
Figure 5C:
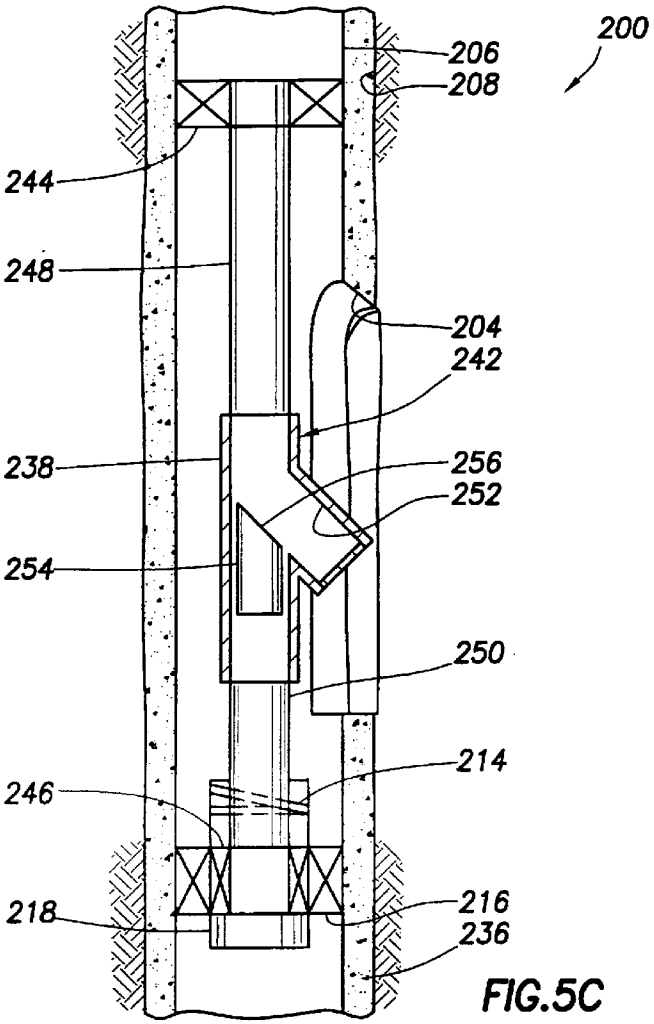

Referring now to FIG. 5C, an assembly 242 is conveyed into the well and engaged with the orienting profile 214. The assembly 242 includes the wellbore connector 238, an upper packer or other sealing and/or anchoring device 244, a lower sealing device 246, an upper tubular member 248 sealingly interconnected between the packer 244 and the wellbore connector, and a lower tubular member 250 sealingly interconnected between the sealing device 246 and the wellbore connector. Engagement of the assembly 242 with the orienting profile 214 causes a lateral flow passage 252 of the wellbore connector 238 to face toward the opening 204 when the wellbore connector is expanded or extended as shown in FIG. 5C.

With the wellbore connector 238 oriented as shown, the sealing device 246 is sealingly engaged with the packer 216 and/or the tubular member 218. The packer 244 is set in the casing 206, thereby anchoring the wellbore connector 238 in the position shown in FIG. 5C The wellbore connector 238 is expanded or extended, so that the lateral flow passage 252 extends outwardly therefrom. Note that cement may be placed in the space surrounding the wellbore connector 238, as described for the methods 10 and 60 above, the parent wellbore may be extended, etc., without departing from the principles of the present invention.

A deflection device 254 is positioned within the wellbore connector 238. An upper laterally inclined deflection surface 256 formed on the deflection device 254 faces toward the flow passage 252. The deflection device 254 may be engaged with an orienting profile 258 (see FIG. 5D) formed on, or attached to, the wellbore connector 238.

Referring now to FIG. 5D, the lateral wellbore 210 is drilled by passing a cutting tool (not shown) through the tubular member 248 and into the wellbore connector 238, laterally deflecting the cutting tool off of the deflection surface 256 and through the flow passage 252, and drilling into the earth. A liner, casing, or other tubular member 260 is then installed in the lateral wellbore 210. A sealing device 262 carried at an upper end of the tubular member 260 is sealingly engaged with the wellbore connector 238 at the flow passage 252.

The tubular member 260 may be cemented within the lateral wellbore 210 at the same time, or subsequent to, placement of cement, if any, surrounding the wellbore connector 238. Alternatively, the tubular member 260 may be sealingly engaged with another tubular member (not shown) previously cemented within the lateral wellbore 210, in a manner similar to that shown in FIG. 3B and described above.

Figure 6B:
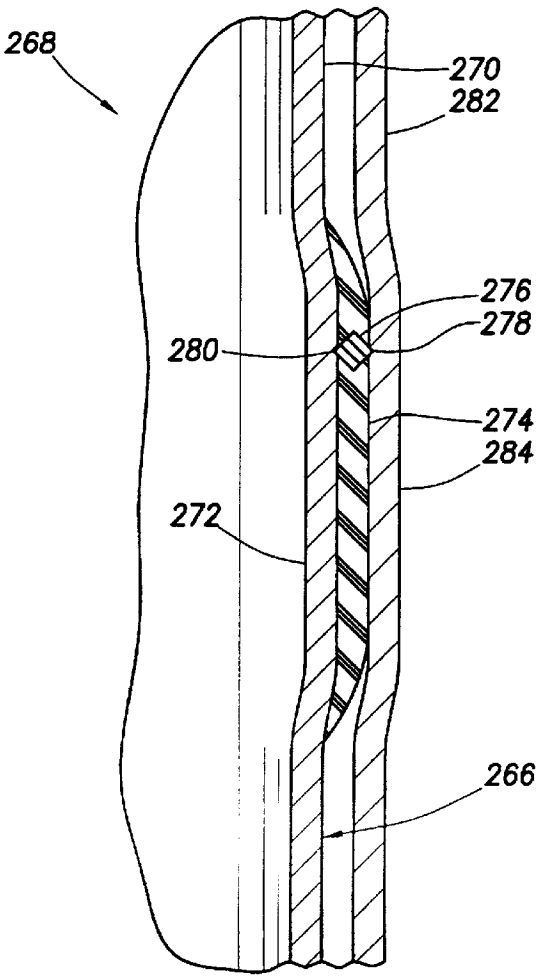
FIGS. 6A–6B are partially elevational and partially cross-sectional views of a sealing device embodying principles of the present invention.
Figure 6A:
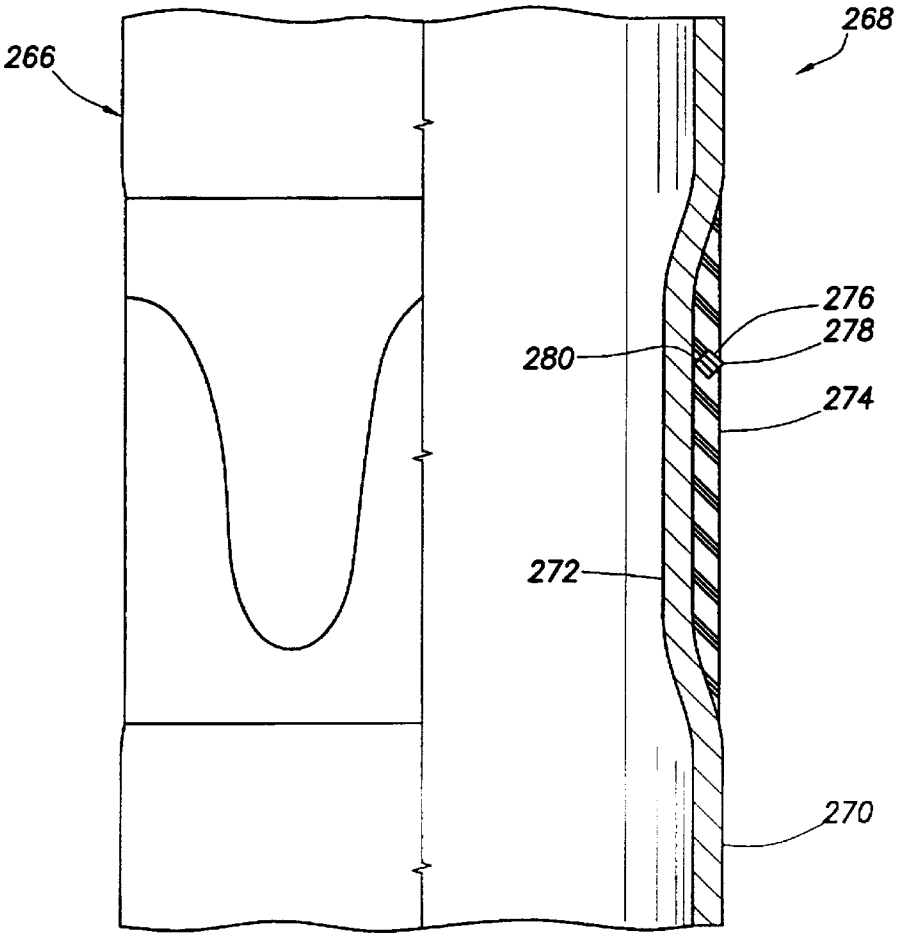
Figure 6E:
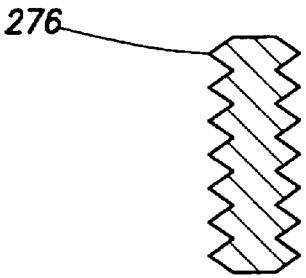
FIGS. 6C–6F are somewhat enlarged cross-sectional views of alternate forms of a grip member utilized in the sealing device of FIGS. 6A–6B

Referring additionally now to FIGS. 6A&6B, a sealing device 266 and a method of sealingly interconnecting tubular members 268 are representatively illustrated. The sealing device 266 may be utilized for any of the sealing devices described above, and the method 268 may be utilized for sealingly interconnecting any of the tubular members or tubular portions of elements described above.

Referring now to FIG. 6A, the sealing device 266 includes a tubular member 270 having a radially reduced portion 272. A sealing material 274 is carried externally on the radially reduced portion 272. A circumferentially continuous grip member or slip 276 is also carried externally on the radially reduced portion 272.

The sealing material 274 may be an elastomer, a non-elastomer, a metallic sealing material, etc. The sealing material 274 may be molded onto the radially reduced portion 272, bonded thereto, separately fitted thereto, etc. As shown in FIG. 6A, the sealing material 274 is generally tubular in shape with generally smooth inner and outer side surface, but the sealing material could have grooves, ridges, etc. formed thereon to enhance sealing contact between the sealing material and the tubular material 270, or another tubular member in which it is expanded. Additionally, backup rings (not shown) or other devices for enhancing performance of the sealing material 274 may also be positioned on the radially reduced portion 272.

The grip member 276 is representatively illustrated in FIG. 6A as being molded within the sealing material 274, but the grip member could alternatively be separately disposed on the radially reduced portion 272, or on another radially reduced portion formed on the tubular member 270. The grip member 276 has a generally diamond-shaped cross-section, with an apex 278 thereof extending slightly outward from the sealing material 274, and an apex 280 contacting the radially reduced portion 272.

When the radially reduced portion 272 is radially outwardly extended, as described more fully below, the apex 280 bites into and grips the radially reduced portion 272 and the apex 278 bites into and grips the tubular member or other structure 282 (see FIG. 6B) in which the sealing device 266 is received. The diamond or other shape may be used to create a metal-to-metal seal between the tubular members 270, 282, provide axial gripping force therebetween, etc. However, it is to be clearly understood that the grip member 276 could be shaped otherwise, and could grip the tubular embers 770, 282 and other structures in other manners, without departing from the principles of the present invention. For example, alternate shapes for the grip members 276 may be utilized to increase gripping force, provide sealing ability, limit depth of penetration into either tubular member 270, 282, etc.

The grip member 276 extends continuously circumferentially about the radially reduced portion 272. As it extends about the radially reduced portion 272 the grip member 276 undulates longitudinally, as may be clearly seen in the left side elevational view portion of FIG. 6A. Thus, the grip member 276 is circumferentially corrugated, which enables the grip member to be conveniently installed on the radially reduced portion 272, prevents the grip member from rotating relative to the radially reduced portion (that is, maintains the apexes 278, 280 facing radially outward and inward, respectively), and permits the grip member to expand circumferentially when the radially reduced portion is extended radially outward. It is, however, not necessary in keeping with the principles of the present invention for the grip member 276 to be circumferentially continuous, for the grip member to be circumferentially corrugated, or for the grip member to be included in the sealing device 266 at all, since the sealing device may sealingly engage another structure without utilizing the grip member.

The grip member 276 is shown as being made of a metallic material, such as hardened steel, but it is to be understood that it may alternatively be made of any other type of material. For example, the grip member 276 could be an aggregate-covered non-elastomeric material, the aggregate gripping the tubular member 270 and the structure in which it is received when the radially reduced portion 272 is radially outwardly extended. Additionally, note that the grip member 276 may serve as a backup for the sealing material 274, preventing extrusion of the sealing material when fluid pressure is applied thereto. Indeed, multiple grip members 276 could be provided for axially straddling the sealing material 274, so that the sealing material is confined therebetween when the radially reduced portion 272 is radially outwardly extended.

The radially reduced portion 272 presents an internal diametrical restriction within the tubular member 270 as representatively illustrated in FIG. 6A. Preferably, but not necessarily, the radially reduced portion 272 presents the minimum internal dimension of the tubular member 270, so that when the radially reduced portion is radially outwardly extended, the minimum internal dimension of the tubular member is increased thereby. In this manner, access and fluid flow through the tubular member 270 are enhanced when the radially reduced portion 272 is radially outwardly extended.

Referring now to FIG. 6B, the sealing device 266 is representatively illustrated received within another tubular member 282, with the radially reduced portion 272 radially outwardly extended. The tubular member 282 could alternatively be another type of structure, not necessarily tubular, in which the radially reduced portion 272 may be extended and the sealing material 274 may be sealingly engaged.

The grip member 276 now grippingly engages both tubular members 270, 282. The apex 280 has pierced the outer surface of the radially reduced portion 272, and the apex 278 has pierced the inner surface of the tubular member 282. Relative axial displacement between the tubular members 270, 282 is, thus, prevented by the grip member 276. Additionally, since the grip member 276 is circumferentially corrugated (or otherwise may extend at least partially longitudinally between the tubular members 270, 282), relative rotational displacement between the tubular members is also prevented. It will also be readily appreciated that the grip member 276 may form a metal-to-metal or other type of seal between the tubular members 270, 282, and, thus, the grip member may itself be a sealing material.

The sealing material 274 now extends radially outward beyond the outer side surface of the tubular member 270 and sealingly engages the inner side surface of the tubular member 282. Note that, prior to radially outwardly extending the radially reduced portion 272, the sealing material 274, as well as the grip member 276, is radially inwardly disposed relative to the outer side surface of the tubular member 270 (see FIG. 6A), thus preventing damage to these elements as the tubular member is conveyed within a well, inserted into or through other structures, etc.

When the radially reduced portion 272 is radially outwardly extended, a longitudinal portion 284 of the tubular member 282 may also be radially outwardly displaced as shown in FIG. 6B. The radially reduced portion 272 is preferably, but not necessarily, plastically deformed when it is radially outwardly extended, so that it remains radially outwardly extended when the force causing the outward extension is removed. As shown in FIG. 6B, the radially reduced portion 277 may actually extend radially outward beyond the remainder of the outer side surface of the remainder of the tubular member 270 when the force is removed.

The longitudinal portion 284 is also preferably, but not necessarily, plastically deformed when it is radially outwardly displaced. In this manner, the longitudinal portion 284 will continue to exert a radially inwardly directed compressive force on the sealing material 274 and/or grip member 276 when the force causing the outward extension is removed from the radially reduced portion 272.

It will be readily appreciated by one skilled in the art that the sealing device 266 and method 268 described above and shown in FIGS. 6A&6B permits a tubular member to be sealingly engaged with another tubular member or other structure utilizing very little cross-sectional thickness. Thus, minimal internal dimensional restriction, if any, is caused by the sealing device 266 after it is radially outwardly extended. Additionally, very little internal dimensional restriction is presented by the radially reduced portion 272, even when it has not been radially outwardly extended.

Figure 6F:
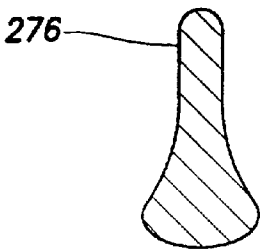
Figure 6C:
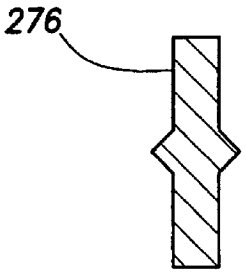
Figure 6D:
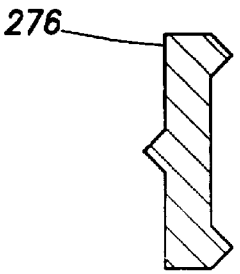

Representatively illustrated in FIGS. 6C–6F are examples of alternate forms of the grip members 276. It will be readily appreciated by a person skilled in the art that FIGS. 6C&D demonstrate forms of the grip member 276 which limit penetration of the grip member into the tubular members 270, 282, FIGS. 6D&F demonstrate that the grip member 276 is not necessarily symmetrical in shape. FIG. 6F demonstrates that the grip member does not necessarily penetrate the surfaces of the tubular members, and FIG. 6E demonstrates that the grip member may be longitudinally grooved or otherwise provided with alternate types of gripping surfaces. Thus, the grip member 276 may have any of a variety of shapes without departing from the principles of the present invention.

Figure 7:
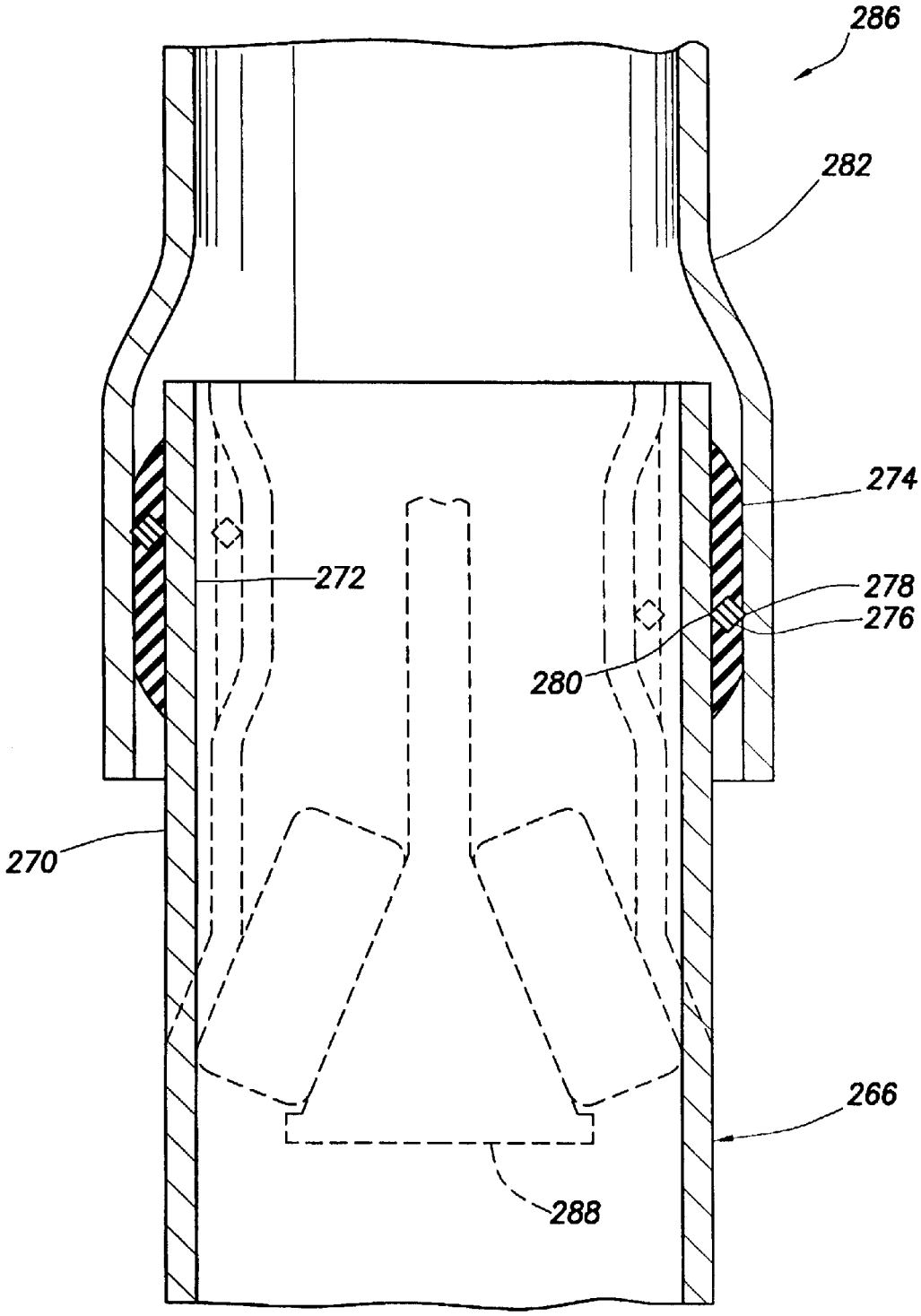
FIG. 7 is a cross-sectional view of a method of sealingly attaching tubular members, the method embodying principles of the present invention.

Referring additionally now to FIG. 7, a method 286 of radially outwardly extending the sealing device 266 is representatively illustrated. The sealing device 266 is shown in FIG. 7 in dashed lines before it is radially outwardly extended, and in solid lines after it is radially outwardly extended.

To radially outwardly extend the sealing device 266, a tool, such as a conventional roller swage 288 (shown schematically in dashed lines in FIG. 7) or other swaging tool, etc., is installed in the tubular member 270. The swage 288 is rotated and longitudinally displaced through at least the radially reduced portion 272. The radially reduced portion 272 is thereby radially outwardly extended and the sealing device 266 sealingly and grippingly engages the tubular member 282.

Additionally, the swage 288 may be displaced through all or a portion of the remainder of the tubular member 270 as shown in FIG. 7. In this manner, the tubular member 270 may more conveniently be installed in, passed through, etc., the tubular member 282 before it is radially outwardly extended by the swage 288. Furthermore, the swage 288 may also be used to radially outwardly extend the tubular member 282 or conform it to a shape more readily sealingly engaged by the sealing device 266. For example, if the tubular member 282 is a previously contracted or retracted portion of a wellbore connector (such as the tubular structure surrounding the lateral flow passage 26 of the wellbore connector 22 shown in FIG. 1D), which has been expanded or extended, the swage 288 may be used to appropriately shape the flow passage 26 prior to insertion of the tubular member 52 therethrough.

Note that, as shown in FIG. 7, after the sealing device 266 is radially outwardly extended, the internal diameter of the tubular member 270 is at least as great as the internal diameter of the tubular member 282. Thus, the sealing device 266 permits the tubular members 270, 282 to be sealingly and grippingly engaged with each other, without presenting an internal dimensional restriction, even though one of the tubular members is received within, or passed through, the other tubular member.

Figure 8:
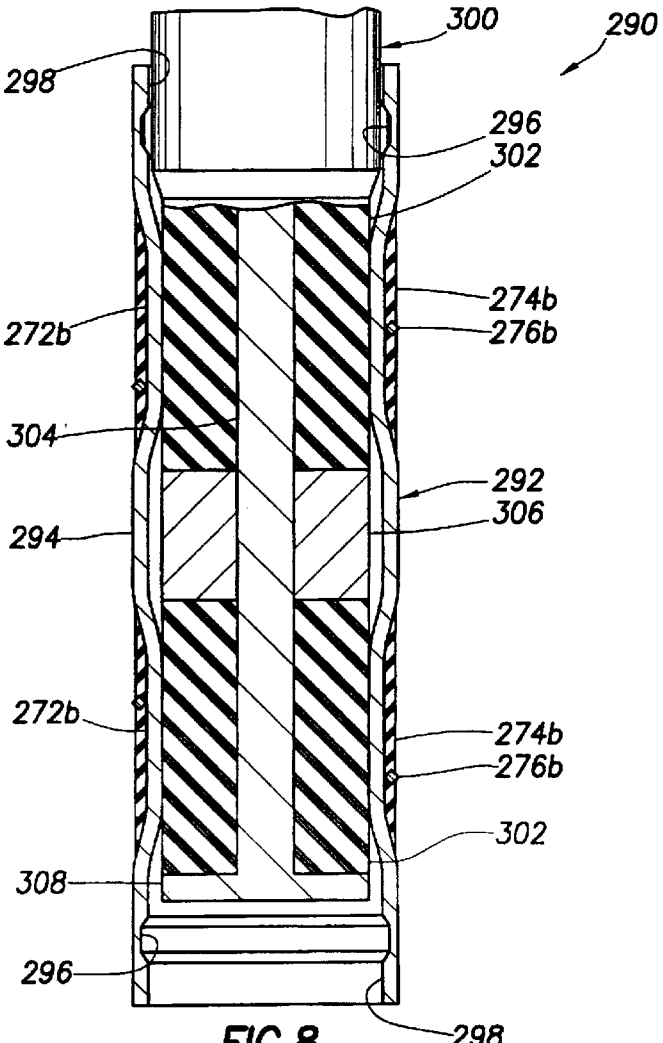
FIG. 8 is a cross-sectional view of a packer and a first method of setting the packer, the packer and method embodying principles of the present invention.

Referring additionally now to FIG. 8, another method of radially outwardly extending a sealing device 290 is representatively illustrated. Additionally, a sealing device configured as a packer 292 is representatively illustrated. Elements which are similar to those previously described are indicated in FIG. 8 using the same reference numbers, with an added suffix "b".

The packer 292 includes a generally tubular member 294 having two longitudinally spaced apart radially reduced portions 272b formed thereon. A sealing material 274b and grip member 276b is carried externally on each of the radially reduced portions 272b. It is to be clearly understood, however, that the packer 292 may include any number of the radially reduced portions 272b, sealing materials 274b and grip members 276b, including one, and that any number of the sealing materials and grip members may be carried on one of the radially reduced portions. For example, multiple sealing materials 274b and/or grip members 276b may be disposed on one radially reduced portion 272b. Additionally, the packer 292 may actually be configured as another type of sealing and/or anchoring device, such as a tubing hanger, plug, etc.

At opposite ends thereof, the tubular member 294 has latching profiles 296 formed internally thereon. Seal bores 298 are formed internally adjacent the latching profiles 296. The latching profiles 296 and seal bores 298 permit sealing attachment of tubular members, tools, equipment, etc. to the packer 292. Of course, other attachment and sealing elements may be used in addition to, or in place of the latching profiles 296 and seal bores 298. For example, the packer 292 may be provided with internal or external threads at one or both ends for interconnection of the packer in a tubular string.

As representatively depicted in FIG. 8, a setting tool 300 is latched to the upper latching profile 296 for conveying the packer 292 into a well and setting the packer therein. The setting tool 300 has axially spaced apart annular elastomeric members 302 disposed on a generally rod-shaped mandrel 304. An annular spacer 306 maintains the spaced apart relationship of the elastomeric members 302. Each of the elastomeric members -02 is thus positioned radially opposite one of the radially reduced portions 272b.

With the setting tool 300 in the configuration shown in FIG. 8, the packer 292 may be conveyed within a tubular member (not shown) in a well. However, when the setting tool 300 is actuated to set the packer 292, the radially reduced portions 272b are radially outwardly extended, so that the packer sealingly and grippingly engages the tubular member (see FIG. 10). Radially outward extension of the radially reduced portions 272b is accomplished by displacing the mandrel 304 upward as viewed in FIG. 8 relative to the portion of the setting tool latched to the latching profile 296. The elastomeric members 302 will be thereby axially compressed between a radially enlarged portion 308 formed on the mandrel 304, the spacer 306, and the portion of the setting tool latched to the upper latching profile 296. When the elastomeric members 302 are axially compressed, they become radially enlarged, applying a radially outwardly directed force to each of the radially reduced portions 272b.

The mandrel 304 may be upwardly displaced to compress the elastomeric members 302 in any of a number of ways. For example, fluid pressure could be applied to the setting tool 300 to displace a piston therein connected to the mandrel 304, a threaded member of the setting tool engaged with the mandrel could be rotated to displace the mandrel, etc.

Figure 9:
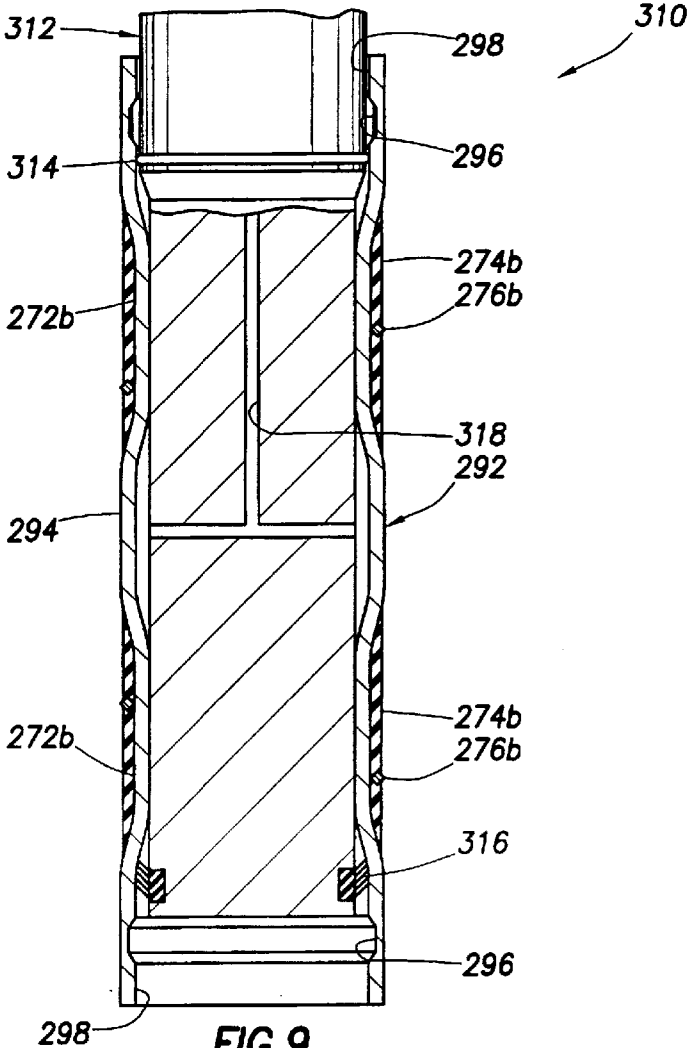
FIG. 9 is a cross-sectional view of the packer of FIG. 8 and a second method of setting the packer, the method embodying principles of the present invention.

Referring additionally now to FIG. 9, yet another method 310 of setting the packer 292 is representatively illustrated. In the method 310, a setting tool 312 is latched to the upper latching profile 296, in a manner similar that used to latch the setting tool 300 to the packer 292 in the method 290 described above. The setting tool 312 includes spaced apart seals 314, 316, which internally sealingly engage the tubular member 294 above and below the radially reduced portions 272b. A flow passage 318 extends internally from within the setting tool 312 to the annular space radially between the setting tool and the tubular member 294 and axially between the seals 314, 316.

When it is desired to set the packer 292, fluid pressure is applied to the flow passage 318. The fluid pressure exerts a radially outwardly directed force to the interior of the tubular member 294 between the seals 314, 316, thereby radially outwardly extending the radially reduced portions 272b. The fluid pressure may be applied to the flow passage 318 in any of a number of ways, for example, via a tubular string attached to the setting tool 312, combustion of a propellant within the setting tool, etc.

Figure 10:
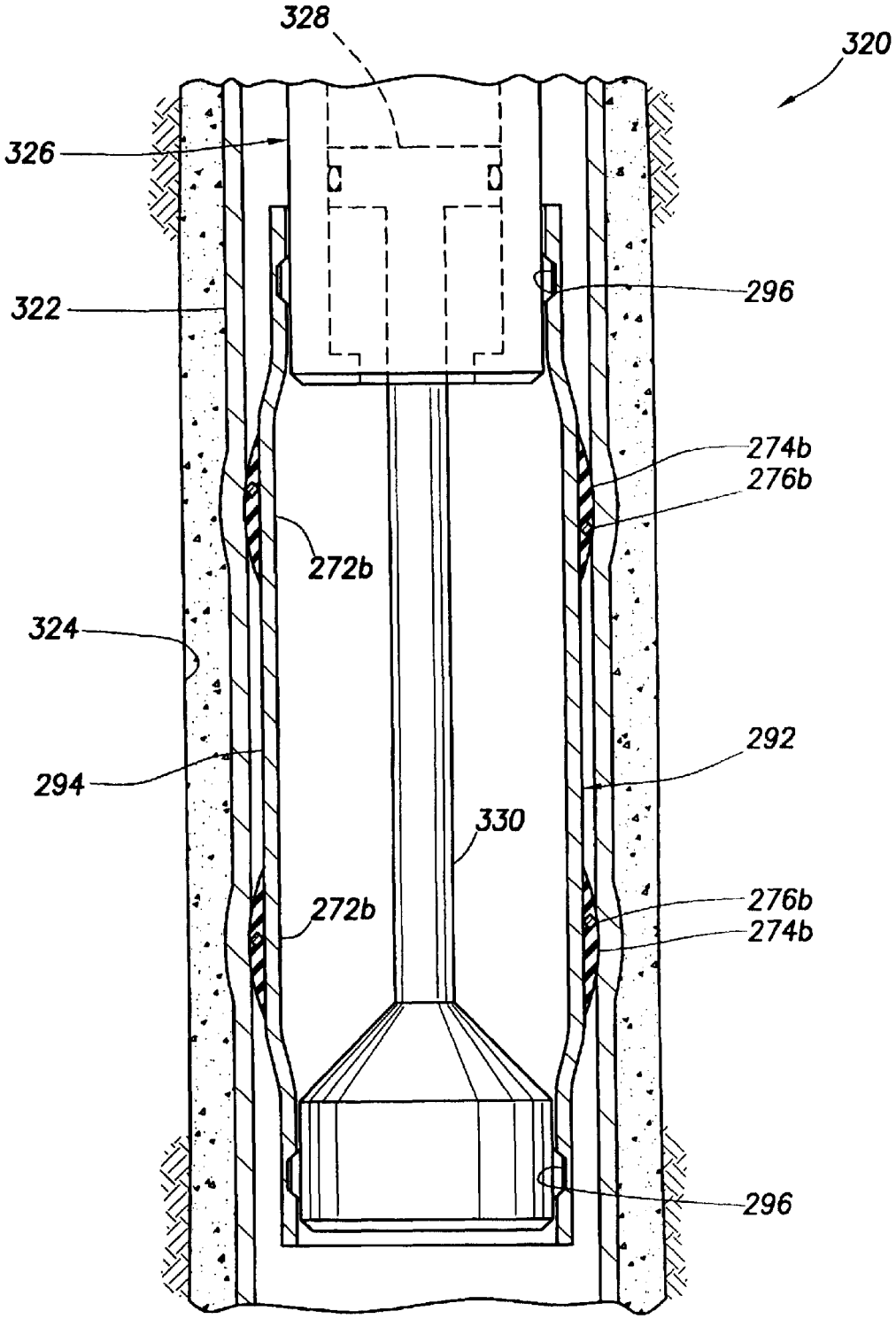
FIG. 10 is a cross-sectional view of the packer of FIG. 8 and a method of retrieving the packer, the method embodying principles of the present invention.

Referring additionally now to FIG. 10, the packer 292 is representatively illustrated set within casing 322 lining a wellbore 324. The packer 292 sealingly and grippingly engages the casing 322. Note that the casing 322 is radially outwardly deformed opposite the radially outwardly extended radially reduced portions 272b, but such deformation is not necessary according to the principles of the present invention.

FIG. 10 representatively illustrates a method 320 of unsetting the packer 292 after it has been set, so that the packer may be retrieved or otherwise displaced from or within the well. A service tool 326 is conveyed into the casing 322 and inserted into the packet 292. The service tool 326 is latched to the upper and lower latching profiles 296 in a conventional manner.

Fluid pressure is then applied to a piston 328 attached to, or formed as a portion of, an elongated mandrel 330, which is latched to the lower latching profile 296. An axially downwardly directed force is thereby applied to the mandrel 330. This force causes the lower end of the tubular member 294 to be displaced axially downward relative to the upper end thereof, axially elongating the tubular member and causing the tubular member to radially inwardly retract.

When sufficient force is applied to elongate the tubular member 294, the sealing material 274b and grip members 276b will disengage from the casing 322, permitting the packer 292 to be retrieved from the well or otherwise displaced relative to the casing. The fluid pressure may be applied to the piston 328 in any of a number of ways, such as via a tubular string attached to the tool 326, combustion of a propellant within the setting tool, etc.

Of course, many modifications, additions, substitutions, deletions, and other changes may be made to the various embodiments of the present invention described above, which changes would be obvious to a person skilled in the art, and these changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of interconnecting first and second wellbores, the method comprising the steps of:

positioning a deflection device within the first wellbore, the deflection device having a substantially longitudinally extending guide layer outwardly overlying a body of the deflection device, and the guide layer having a hardness substantially less than that of the body, and displacing a cutting tool substantially longitudinally relative to the deflection device, a guide portion of the cutting tool contacting the guide layer, thereby guiding the cutting tool to cut an opening through a tubular structure lining the first wellbore while cutting through the guide layer.

2. The method according to claim 1 wherein the positioning step further comprises engaging the deflection device with an orienting device within the first wellbore.

3. The method according to claim 2, further comprising the step of engaging a wellbore connector with the orienting device.

4. The method according to claim 3, further comprising the step of extending a portion of the wellbore connector laterally outward into the opening.

5. The method according to claim 3, further comprising the step of drilling the second wellbore through the wellbore connector.

6. The method according to claim 5, further comprising the step of sealingly engaging the wellbore connector with a tubular member extending into the second wellbore.

7. Apparatus for forming an opening through a tubular structure lining a wellbore, the apparatus comprising:

an elongated body having a generally longitudinally extending outer side surface portion positionable to face the intended opening location on the tubular structure, and along which a cutting tool may be moved while forming the opening; and a guide layer attached to the outer side surface portion, the guide layer having a hardness substantially less than that of the body and being removable by a cutting tool as it moves along the outer side surface portion while forming the opening.

8. The apparatus according to claim 7, wherein the body further has an opening device engagement portion attached thereto, the engagement portion being configured for engagement with an orienting profile positioned in the wellbore.

9. The apparatus according to claim 7, wherein the body further has a laterally inclined deflection surface formed thereon proximate an end of the body.

10. The apparatus according to claim 9, wherein the guide layer is not attached to the deflection surface.

11. The apparatus according to claim 7, further comprising a cutting tool releasably secured to the body.

12. The apparatus according to claim 11, wherein the cutting tool includes a guide portion, the guide portion contacting the guide layer and being guided longitudinally thereby when the cutting tool is displaced longitudinally relative to the body.

13. The apparatus according to claim 11, wherein the cutting tool is configured to cut through the guide layer when the cutting tool is displaced longitudinally relative to the body.

*14. A system for interconnecting a tubular member to a wellbore connector in a subterranean well, the system comprising:*

*the wellbore connector expanded within the well;*

*the tubular member expanded within and connected to the expanded wellbore connector; and*

*the wellbore connector providing fluid communication between each of at least three wellbores.*

*15. The system according to claim 14, wherein the tubular member is expanded within a flow passage of the wellbore connector.*

*16. The system according to claim 14, wherein the tubular member is sealed within the wellbore connector.*

*17. The system according to claim 14, wherein the tubular member is plastically deformed within the wellbore connector.*

*18. The system according to claim 14, further comprising a grip member providing gripping engagement between the tubular member and the wellbore connector.*

*19. A system for interconnecting a tubular member to a wellbore connector in a subterranean well, the system comprising:*

*the wellbore connector expanded within the well, the expanded wellbore connector providing a connection between at least three wellbores;*

*the tubular member expanded within and connected to the expanded wellbore connector; and*

*a sealing material positioned between the tubular member and the wellbore connector.*

*20. The system according to claim 19, wherein the sealing material is positioned overlying a radially reduced portion of the tubular member, the radially reduced portion being expanded outward when the tubular member is expanded.*

*21. The system according to claim 20, further comprising a grip member embedded in the sealing material.*

*22. A method of interconnecting a tubular member to a flow passage in a subterranean well, the method comprising the steps of:*

*expanding a wellbore connector in the well, the wellbore connector having the flow passage formed therein;*

*then expanding the tubular member within the expanded wellbore connector; and*

*providing fluid communication between each of at least three wellbores via the wellbore connector.*

*23. The method according to claim 22, wherein the wellbore connector expanding step further comprises expanding the flow passage.*

*24. The method according to claim 23, wherein the tubular member expanding step further comprises expanding the tubular member within the expanded flow passage.*

*25. The method according to claim 22, wherein the tubular member expanding step further comprises sealing between the tubular member and the wellbore connector.*

*26. The method according to claim 22, wherein the tubular member expanding step further comprises securing the tubular member to the wellbore connector.*

*27. The method according to claim 22, wherein the tubular member is a portion of a hanger, and wherein the tubular member expanding step further comprises setting the hanger in the wellbore connector.*

*28. The method according to claim 22, wherein the wellbore connector expanding step further comprises conforming the flow passage to a generally cylindrical shape.*

*29. The method according to claim 22, wherein the tubular member expanding step further comprises plastically deforming the tubular member.*

*30. The method according to claim 22, wherein the tubular member expanding step further comprises swaging the tubular member outward.*

*31. A method of interconnecting a tubular member to a flow passage in a subterranean well, the method comprising the steps of:*

*expanding a wellbore connector in the well, the wellbore connector having the flow passage formed therein; and*

*then expanding the tubular member within the expanded wellbore connector, including compressing an elastomeric member within the tubular member.*

*32. A method of interconnecting a tubular member to a flow passage in a subterranean well, the method comprising the steps of:*

*expanding a wellbore connector in the well, the wellbore connector having the flow passage formed therein; and*

*then expanding the tubular member within the expanded wellbore connector, the tubular member having a sealing material externally disposed thereon.*

*33. The method according to claim 32, wherein the tubular member expanding step further comprises sealingly engaging the sealing material with the flow passage.*

*34. The method according to claim 32, wherein a grip member is embedded in the sealing material, and wherein the tubular member expanding step further comprises grippingly engaging the grip member with the flow passage.*

*35. The method according to claim 32, wherein the sealing material is disposed on a radially reduced portion of the tubular member, and wherein the tubular member expanding step further comprises outwardly displacing the radially reduced portion.*

*36. The method according to claim 35, wherein the radially reduced portion comprises a minimum internal dimension of the tubular member prior to the tubular member expanded step.*

*37. The method according to claim 36, wherein in the tubular member expanding step, the radially reduced portion no longer comprises the minimum internal dimension of the tubular member.*

*38. The method according to claim 32, wherein the sealing material is disposed radially inward relative to an outer*

*side surface of the tubular member prior to the tubular member expanding step, and wherein the tubular member expanding step further comprises displacing the sealing material outward past the outer side surface.*

*39. A method of interconnecting a tubular member to a flow passage in a subterranean well, the method comprising the steps of:*

*expanding a wellbore connector in the well, the wellbore connector having the flow passage formed therein; and*

*then expanding the tubular member within the expanded wellbore connector, the tubular member having a grip member externally disposed thereon.*

*40. The method according to claim 39, wherein in the tubular member expanding step, the grip member is circumferentially continuous about the tubular member.*

*41. The method according to claim 39, wherein in the tubular member expanding step, the grip member is circumferentially corrugated about the tubular member.*

*42. The method according to claim 39, wherein the tubular member expanding step further comprises circumferentially expanding the grip member.*

*43. The method according to claim 39, wherein the tubular member expanding step further comprises preventing relative axial and rotational displacement between the tubular member and the flow passage by gripping engagement between the grip member and the flow passage.*

*44. The method according to claim 39, wherein the tubular member expanding step further comprises sealingly engaging the grip member with the flow passage.*

*45. The method according to claim 39, wherein the grip member is embedded in a sealing material, and wherein the tubular member expanding step further comprises sealingly engaging the sealing material with the flow passage.*

*46. The method according to claim 39, wherein the tubular member expanding step further comprises utilizing the grip member to prevent extrusion of a sealing material on the tubular member.*

*47. The method according to claim 39, wherein the grip member is disposed on a radially reduced portion of the tubular member, and wherein the tubular member expanding step further comprises outwardly displacing the radially reduced portion.*

*48. The method according to claim 47, wherein the radially reduced portion comprises a minimum internal dimension of the tubular member prior to the tubular member expanding step.*

*49. The method according to claim 48, wherein in the tubular member expanding step, the radially reduced portion no longer comprises the minimum internal dimension of the tubular member.*

*50. The method according to claim 49, wherein the grip member is disposed radially inward relative to an outer side surface of the tubular member prior to the tubular member expanding step, and wherein the tubular member expanding step further comprises displacing the grip member outward past the outer side surface.*

*51. A method of interconnecting a tubular member to a flow passage in a subterranean well, the method comprising the steps of:*

*forming the flow passage in a wellbore connector;*

*expanding the wellbore connector flow passage in the well;*

*attaching an expandable hanger to the tubular member; and*

*expanding the hanger within the expanded flow passage by expanding the tubular member.*

*52. The method according to claim 51, wherein the hanger expanding step further comprises sealing between the hanger and the flow passage.*

*53. The method according to claim 51, wherein the hanger expanding step further comprises preventing relative displacement between the hanger and the flow passage.*

*54. The method according to claim 51, wherein the flow passage expanding step further comprises conforming the flow passage to a generally cylindrical shape.*

*55. The method according to claim 51, wherein the hanger expanding step further comprises plastically deforming the hanger.*

*56. The method according to claim 51, wherein the hanger expanding step further comprises swaging the hanger outward.*

*57. The method according to claim 51, wherein the hanger expanding step further comprises compressing an elastomeric member within the hanger.*

*58. The method according to claim 51, wherein in the hanger expanding step, the hanger has a sealing material externally disposed thereon.*

*59. The method according to claim 58, wherein the hanger expanding step further comprises sealingly engaging the sealing material with the flow passage.*

*60. The method according to claim 58, wherein a grip member is embedded in the sealing material, and wherein the hanger expanding step further comprises grippingly engaging the grip member with the flow passage.*

*61. The method according to claim 58, wherein the sealing material is disposed on a radially reduced portion of the hanger, and wherein the expanding step further comprises outwardly displacing the radially reduced portion.*

*62. The method according to claim 61, wherein the radially reduced portion comprises a minimum internal dimension of the hanger prior to the expanding step.*

*63. The method according to claim 62, wherein in the hanger expanding step, the radially reduced portion no longer comprises the minimum internal dimension of the hanger.*

*64. The method according to claim 62, wherein the sealing material is disposed radially inward relative to an outer side surface of the hanger prior to the hanger expanding step, and wherein the hanger expanding step further comprises displacing the sealing material outward past the outer side surface.*

*65. The method according to claim 51, wherein in the hanger expanding step, the hanger has a grip member externally disposed thereon.*

*66. The method according to claim 65, wherein in the hanger expanding step, the grip member is circumferentially continuous about the hanger.*

*67. The method according to claim 65, wherein in the hanger expanding step, the grip member is circumferentially corrugated about the hanger.*

*68. The method according to claim 65, wherein the hanger expanding step further comprises circumferentially expanding the grip member.*

*69. The method according to claim 65, wherein the hanger expanding step further comprises preventing relative axial and rotational displacement between the hanger and the flow passage by griping engagement between the grip member and the flow passage.*

*70. The method according to claim 65, wherein the hanger expanding step further comprises sealingly engaging the grip member with the flow passage.*

*71. The method according to claim 65, wherein the grip member is embedded in a sealing material, and wherein the*

*hanger expanding step further comprises sealingly engaging the sealing material with the flow passage.*

*72. The method according to claim 65, wherein the hanger expanding step further comprises utilizing the grip member to prevent extrusion of a sealing material on the hanger.*

*73. The method according to claim 65, wherein the grip member is disposed on a radially reduced portion of the hanger, and wherein the hanger expanding step further comprises outwardly displacing the radially reduced portion.*

*74. The method according to claim 73, wherein the radially reduced portion comprises a minimum internal dimension of the hanger prior to the hanger expanding step.*

*75. The method according to claim 74, wherein in the hanger expanding step, the radially reduced portion no longer comprises the minimum internal dimension of the hanger.*

*76. The method according to claim 65, wherein the grip member is disposed radially inward relative to an outer side surface of the hanger prior to the hanger expanding step, and wherein the hanger expanding step further comprises displacing the grip member outward past the outer side surface.*

* * * * *